(12) United States Patent
Hatano et al.

(10) Patent No.: US 8,316,907 B2
(45) Date of Patent: Nov. 27, 2012

(54) SUBSTRATE MATERIAL PROCESSING EQUIPMENT AND SUBSTRATE MATERIAL PROCESSING METHOD USING THE SAME

(75) Inventors: Akitsugu Hatano, Osaka (JP); Yoshiki Nakatani, Osaka (JP); Hisao Ochi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 525 days.

(21) Appl. No.: 12/527,932

(22) PCT Filed: Nov. 13, 2007

(86) PCT No.: PCT/JP2007/072011
§ 371 (c)(1),
(2), (4) Date: Aug. 20, 2009

(87) PCT Pub. No.: WO2008/108036
PCT Pub. Date: Sep. 12, 2008

(65) Prior Publication Data
US 2010/0065191 A1 Mar. 18, 2010

(30) Foreign Application Priority Data
Mar. 1, 2007 (JP) .................................. 2007-051669

(51) Int. Cl.
*B65H 69/00* (2006.01)
(52) U.S. Cl. .................... 156/502; 156/157; 156/543
(58) Field of Classification Search .................. 156/157, 156/381, 502, 443, 389, 378, 543, 544, 510; B65H 69/00
See application file for complete search history.

(56) References Cited

U.S. PATENT DOCUMENTS

| | | | | |
|---|---|---|---|---|
| 3,152,500 A | * | 10/1964 | Watts | 83/302 |
| 3,253,489 A | * | 5/1966 | Phillips | 83/88 |
| 4,983,241 A | | 1/1991 | Sawada et al. | |

(Continued)

FOREIGN PATENT DOCUMENTS

JP 03-105154 U 10/1991

(Continued)

OTHER PUBLICATIONS

Official Communication issued in International Patent Application No. PCT/JP2007/072011, mailed on Feb. 26, 2008.

*Primary Examiner* — Khanh P Nguyen
*Assistant Examiner* — Vishal I Patel
(74) *Attorney, Agent, or Firm* — Keating & Bennett, LLP

(57) ABSTRACT

Substrate material processing equipment includes: a substrate material conveying section receiving a substrate material from a first line and conveying it to a second line; a first substrate material dividing section dividing the substrate material; a substrate material recovery section recovering the substrate material from its start edge formed by division; a substrate material supply section supplying a substrate material to an end edge of the substrate material which is formed by division; a first substrate material joining section joining the end edge of the substrate material to a start edge of the substrate material supplied from the substrate material supply section; a second substrate material dividing section provided between the substrate material supply section and the first substrate material joining section; a third substrate material dividing section provided between the first line and the substrate material recovery section; and a second substrate material joining section joining a start edge of the substrate material which is formed by division by the third substrate material dividing section to an end edge of the substrate material which is formed by division by the second substrate material dividing section.

21 Claims, 17 Drawing Sheets

U.S. PATENT DOCUMENTS

| | | | | |
|---|---|---|---|---|
| 5,056,703 A | * | 10/1991 | Sawada et al. | 228/158 |
| 6,886,772 B2 | * | 5/2005 | Hirata et al. | 242/554.2 |
| 7,153,372 B2 | | 12/2006 | Hein et al. | |
| 2003/0079837 A1 | | 5/2003 | Hirai et al. | |
| 2003/0136536 A1 | | 7/2003 | Viljanmaa | |
| 2003/0230178 A1 | * | 12/2003 | Steadman | 83/13 |
| 2005/0211273 A1 | | 9/2005 | Hein et al. | |
| 2007/0044898 A1 | * | 3/2007 | Hikita et al. | 156/159 |

FOREIGN PATENT DOCUMENTS

| | | |
|---|---|---|
| JP | 08-243986 A | 9/1996 |
| JP | 2001-252978 A | 9/2001 |
| JP | 2005-272125 A | 10/2005 |
| JP | 2006-027814 A | 2/2006 |

\* cited by examiner

SUBSTRATE MATERIAL PROCESSING EQUIPMENT AND SUBSTRATE MATERIAL PROCESSING METHOD USING THE SAME

BACKGROUND OF THE INVENTION

1. Field of the Invention

The present invention relates to substrate material processing equipment and a substrate material processing method using it.

2. Description of the Related Art

In processes for manufacturing liquid crystal display devices, organic EL display devices, and the like, various production lines are provided, such as a substrate material exposure line, an exposed substrate material etching line, an etched substrate material cleaning line, and the like.

Recently, studies have been actively conducted on liquid crystal display devices and organic EL display devices using flexible substrates having high flexibility and impact resistance, such as plastic substrates and metal film substrates, in place of hard substrates, such as glass substrates, silicon wafer substrates, and the like. The flexible substrates having high flexibility cannot hold their shapes by themselves. For this reason, display device manufacturing processes use a roll-to-roll system for conveying a band-shape substrate material with tension applied thereto. In the roll-to-roll system, the substrate material is conveyed in a roll to roll format.

In order to increase manufacturing efficiency, in some cases, the production lines may be operated for simultaneously conveying a flexible substrate material by using the roll-to-roll system.

For example, Japanese Unexamined Patent Application Publication 2001-252978 and Japanese Unexamined Patent Application Publication 2003-133230 disclose techniques for processing a flexible substrate, such as a plastic substrate, or the like which uses the roll-to-roll system for conveyance.

However, in conveying a flexible substrate material, such as a plastic substrate material, or the like in a roll-to-roll format, the flexible substrate material is conveyed at once on various production lines. For this reason, upon malfunction caused in a processing apparatus in some production line, not only the processing apparatus to be repaired but all the other processing apparatuses must be stopped, thereby lowering manufacturing efficiency. Further, at that time, the flexible substrate material to be processed stays in the production lines so as to cause oxidation of the surfaces thereof, which may adversely influence quality.

For periodical maintenance performed on the processing apparatuses in the production lines, all the processing apparatuses are stopped. For this reason, in view of the line utilization, the processing apparatuses must be subjected to maintenance at once, thereby increasing manpower necessary for maintenance.

SUMMARY OF THE INVENTION

In view of the foregoing, preferred embodiments of the present invention achieve favorable processing cost and processing efficiency of a continuous flexible substrate material in simultaneous processing of the substrate material in a plurality of manufacturing lines connected to each other.

Substrate material processing equipment in accordance with a preferred embodiment of the present invention is substrate material processing equipment provided between a first line and a second line performing predetermined processes on a continuous flexible substrate material, including: substrate material conveying section configured to receive from the first line and convey to the second line a to-be-processed first substrate material and/or a second flexible substrate material joined to the first flexible substrate material; a first substrate material dividing section configured to divide the first or second flexible substrate material conveyed by the substrate material conveying section from the first line; a substrate material recovery section configured to recover the first or second flexible substrate material from an end edge thereof which is formed by division by the first substrate material dividing section; a substrate material supply section configured to supply the first or second flexible substrate material to an end edge of the substrate material which is formed by division by the first substrate material dividing section; a first substrate material joining section configured to join the end edge of the substrate material to a start edge of the substrate material supplied from the substrate material supply section; a second substrate material dividing section provided between the substrate material supply section and the second line, and configured to divide the first or second flexible substrate material; a third substrate material dividing section provided between the first line and the substrate material recovery section, and configured to divide the first or second flexible substrate material in midstream of recovery by the substrate material recovery section; and a second substrate material joining section configured to join a start edge of the first or second flexible substrate material which is formed by division by the third substrate material dividing section to an end edge of the first or second flexible substrate material which is formed by division by the second substrate material dividing section.

In the substrate material processing equipment in accordance with a preferred embodiment of the present invention, the first substrate material dividing section may serve also as the third substrate material dividing section.

In the substrate material processing equipment in accordance with a preferred embodiment of the present invention, the first substrate material joining section may serve also as the second substrate material joining section.

The substrate material processing equipment in accordance with a preferred embodiment of the present invention may further include: a first substrate material supply adjusting section provided between the first line and the first and third substrate material dividing sections, and configured to send out the first or second flexible substrate material after receiving and storing or while receiving the first or second flexible substrate material from the first line; and a second substrate material supply adjusting section provided between the first and second substrate material joining sections and the second line, and configured to send out the first or second flexible substrate material after receiving and storing or while receiving the first or second flexible substrate material from the first and second substrate material joining sections.

In the substrate material processing equipment in accordance with a preferred embodiment of the present invention, the first and second substrate material supply adjusting sections may include substrate material supply adjusting rolls configured to change a conveyance route by reciprocating in a direction intersected at almost a right angle with a direction in which the first or second flexible substrate material is conveyed, while rotating and coming into contact with a surface of the first or second flexible substrate material.

In the substrate material processing equipment in accordance with a preferred embodiment of the present invention, the substrate material supply adjusting rolls may be configured to come into contact with only a surface on a non-processed side of the conveyed first or second flexible substrate material.

In the substrate material processing equipment in accordance with a preferred embodiment of the present invention, the substrate material conveying section may include a conveyance roll conveying the first or second flexible substrate material by rotating and coming into contact with a surface of the first or second flexible substrate material.

In the substrate material processing equipment in accordance with a preferred embodiment of the present invention, the conveyance roll may be configured to come into contact with only a surface on a non-processed side of the first or second flexible substrate material.

In the substrate material processing equipment in accordance with a preferred embodiment of the present invention, the substrate material recovery section may include a winding roll for winding up and storing the recovered first or second flexible substrate material.

In the substrate material processing equipment in accordance with a preferred embodiment of the present invention, the substrate material supply section may include a winding roll for winding up and storing the to-be-supplied first or second flexible substrate material.

In the substrate material processing equipment in accordance with a preferred embodiment of the present invention, at least one of the first, second, and third substrate material dividing sections may divide the first or second flexible substrate material with the use of a laser beam.

In the substrate material processing equipment in accordance with a preferred embodiment of the present invention, at least one of the first, second, and third substrate material dividing sections may divide the first or second flexible substrate material with the use of a cutter.

In the substrate material processing equipment in accordance with a preferred embodiment of the present invention, at least one of the first, second, and third substrate material dividing sections may divide the first or second flexible substrate material by utilizing water pressure.

The substrate material processing equipment in accordance with a preferred embodiment of the present invention may further include a cleaning section provided after at least one of the first, second, and third substrate material dividing sections to clean the first or second flexible substrate material.

The substrate material processing equipment in accordance with a preferred embodiment of the present invention may further include: a chamber configured to house the substrate material conveying section, the first, second, and third substrate material dividing sections, the substrate material recovery section, the substrate material supply section, and the first and second substrate material joining sections.

In the substrate material processing equipment in accordance with a preferred embodiment of the present invention, the substrate material recovery section may be disposed above substrate material division points of the first, second, and third substrate material dividing sections.

In the substrate material processing equipment in accordance with a preferred embodiment of the present invention, the substrate material supply section may be disposed above substrate material division points of the first, second, and third substrate material dividing sections.

In the substrate material processing equipment in accordance with a preferred embodiment of the present invention, the substrate material recovery section and the substrate material supply section may be disposed on a same side of a conveyance route of the first or second flexible substrate material.

The substrate material processing equipment in accordance with a preferred embodiment of the present invention may further include: an alignment member arranged to adjust substrate material joining points by the first and/or second substrate material joining sections.

In the substrate material processing equipment in accordance with a preferred embodiment of the present invention, at least one of the first, second, and third substrate material dividing sections may include an alignment member to adjust a substrate material division point.

In the substrate material processing equipment in accordance with a preferred embodiment of the present invention, at least one of the first, second, and third substrate material dividing sections may include a position detector arranged to detect a substrate material division point.

A substrate material processing method in accordance with a preferred embodiment of the present invention is a substrate material processing method by which, between a first line and a second line performing predetermined processes on continuous flexible substrate materials, a to-be-processed first flexible substrate material and/or a second flexible substrate material joined to the first flexible substrate material is received from the first line and is conveyed to the second line, the method including: a first substrate material dividing step of dividing the first or second flexible substrate material conveyed from the first line; a substrate material recovering step of recovering the first or second flexible substrate material from a start edge thereof which is formed by division in the first substrate material dividing step; a substrate material supplying step of supplying a second flexible substrate material to an end edge of the first or second flexible substrate material which is formed by division in the first substrate material dividing step; a first substrate material joining step of joining the end edge of the first or second flexible substrate material which is formed by division in the first substrate material dividing step to a start edge of the second flexible substrate material supplied in the substrate material supplying step; a second substrate material dividing step of dividing the second flexible substrate material joined to the end edge of the first or second flexible substrate material which is formed by division in the first substrate material dividing step, and being conveyed; a third substrate material dividing step of dividing the first or second flexible substrate material in midstream of recovery in the substrate material recovering step; and a second substrate material joining step of joining a start edge of the first or second flexible substrate material which is formed by division in the third substrate material dividing step to an end edge of the second flexible substrate material which is formed by division in the second substrate material dividing step.

The substrate material processing method in accordance with a preferred embodiment of the present invention may further include: a first substrate material supply adjusting step of sending out the first or second flexible substrate material after receiving and storing or while receiving the first or second flexible substrate material from the first line; and a second substrate material supply adjusting step of continuously sending out the first or second flexible substrate material to the second line after receiving and storing or while receiving the first or second flexible substrate material after the first and second substrate material joining steps.

In the substrate material processing method in accordance with a preferred embodiment of the present invention, the second flexible substrate material recovered in the substrate material recovering step may be used as the second flexible substrate material supplied in the substrate material supplying step.

In the substrate material processing method in accordance with a preferred embodiment of the present invention, joining of the end edge of the second flexible substrate material which is formed by division in the first substrate material dividing step to the start edge of the second flexible substrate material supplied in the substrate material supplying step and/or joining of the start edge of the second flexible substrate material which is formed by division in the third substrate material dividing step or of the first flexible substrate material to the end edge of the second flexible substrate material which is formed by division in the second substrate material dividing step may be performed by fusing.

In the substrate material processing method in accordance with a preferred embodiment of the present invention, joining of the end edge of the second flexible substrate material which is formed by division in the first substrate material dividing step to the start edge of the second flexible substrate material supplied in the substrate material supplying step and/or joining of the start edge of the second flexible substrate material which is formed by division in the third substrate material dividing step or of the first flexible substrate material to the end edge of the second flexible substrate material which is formed by division in the second substrate material dividing step may be performed with use of a tape having chemical resistance.

In the substrate material processing method in accordance with a preferred embodiment of the present invention, joining of the end edge of the second flexible substrate material which is formed by division in the first substrate material dividing step to the start edge of the second flexible substrate material supplied in the substrate material supplying step and/or joining of the start edge of the second flexible substrate material which is formed by division in the third substrate material dividing step or of the first flexible substrate material to the end edge of the second flexible substrate material which is formed by division in the second substrate material dividing step may be performed with use of a tape having heat resistance.

Another substrate material processing method in accordance with a preferred embodiment of the present invention is a substrate material processing method by which, between a first line and a second line performing predetermined processes on continuous flexible substrate materials, a to-be-processed first flexible substrate material and/or a second flexible substrate material joined to the first flexible substrate material is received from the first line and conveyed to the second line, the method including: a substrate material dividing step of dividing the first flexible substrate material conveyed from the first line; a substrate material recovering step of recovering the first flexible substrate material from a start edge thereof which is formed by division in the substrate material dividing step; and a substrate material supplying step of supplying a first or second flexible substrate material to an end edge of the first flexible substrate material which is formed by division in the substrate material dividing step.

Still another substrate material processing method in accordance with a preferred embodiment of the present invention is a substrate material processing method by which, between a first line and a second line performing predetermined processes on continuous flexible substrate materials, a to-be-processed first flexible substrate material and/or a second flexible substrate material joined to the first flexible substrate material is received from the first line and conveyed to the second line, the method including: a carry-in stopping step of stopping carry-in of the first flexible substrate material from the first line; a substrate material dividing step of dividing the first flexible substrate material of which carry-in from the first step is stopped in the carry-in stopping step; a substrate material supplying step of supplying another flexible substrate material to an end edge of the first flexible substrate material which is formed by division in the substrate material dividing step; and a substrate material joining step of joining the end edge of the first flexible substrate material which is formed by division in the substrate material dividing step to a start edge of the another flexible substrate material supplied in the substrate material supplying step.

In the substrate material processing method in accordance with a preferred embodiment of the present invention, the first or second flexible substrate material may be divided in the substrate material dividing step after a predetermined division point of the conveyed first or second flexible substrate material is detected.

According to preferred embodiments of the present invention, manpower and time required for maintenance can be reduced due to simultaneous processing of a continuous flexible substrate material on a plurality of manufacturing lines connected to each other, thereby achieving favorable processing cost and processing efficiency of the substrate material.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Substrate material processing equipment and a substrate material processing method using it will be described with reference to the drawings by referring to the case where a continuous flexible plastic substrate material is preferably used as the substrate material for manufacturing a display device. The present invention is not limited to the following example preferred embodiments.

Example Preferred Embodiment

Configuration of Substrate Material Processing Equipment 10

Figure 1:
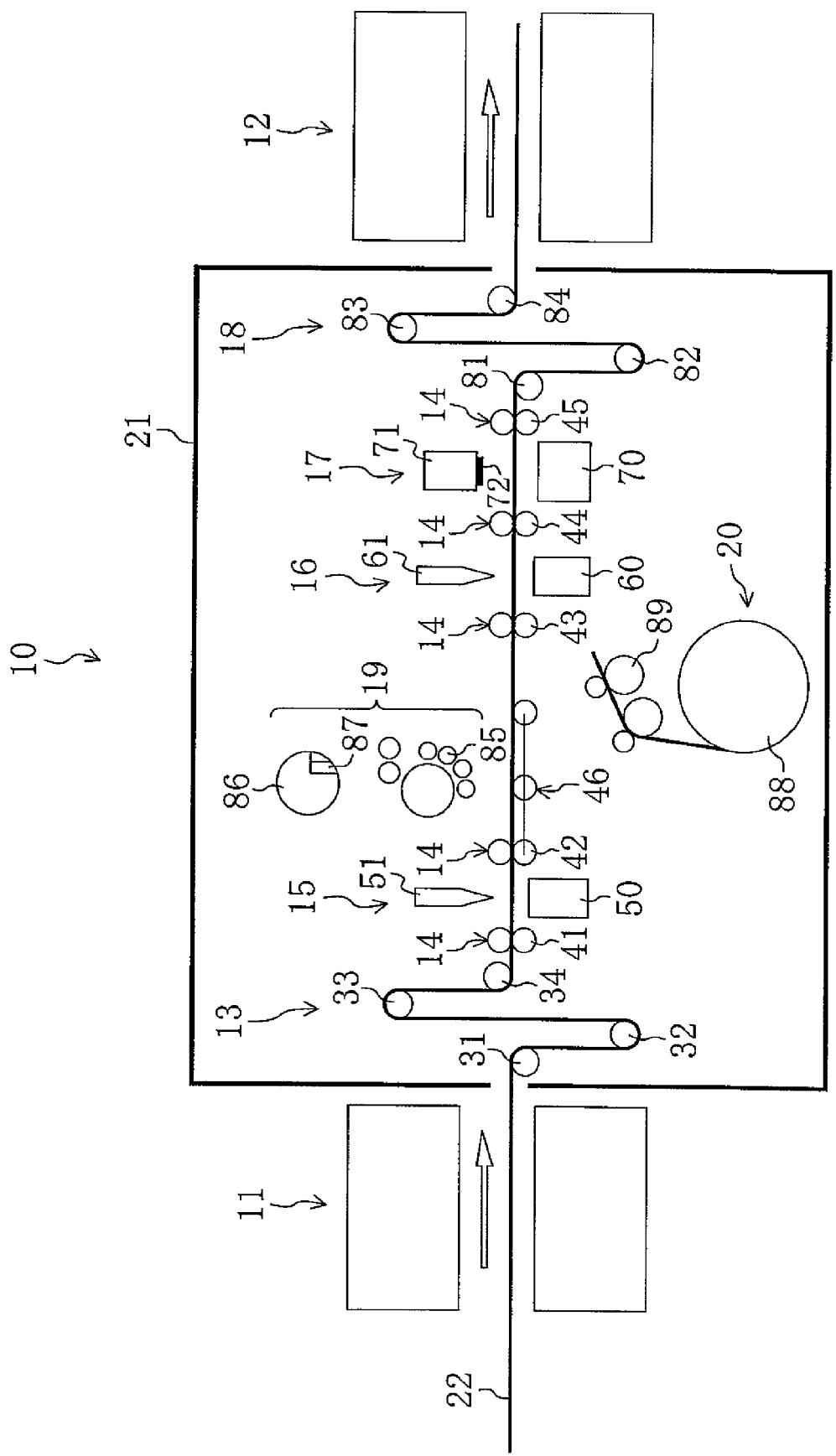
FIG. 1 is a schematic diagram of substrate material processing equipment when a first line and a second line are operated to perform predetermined processes.

FIG. 1 is a schematic diagram showing substrate material processing equipment 10 in accordance with an example preferred embodiment of the present invention. The substrate material processing equipment 10 is provided between two adjacent production lines (a first line 11 and a second line 12) among a plurality of production lines. The substrate material processing equipment 10 includes a first substrate material supply adjusting section 13, a substrate material conveying section 14, a pre-stage substrate material dividing section 15 (a first substrate material dividing section and a third substrate material dividing section), a post-stage substrate material dividing section 16 (a second substrate material dividing section), a substrate material joining section 17 (a first substrate material joining section and a second substrate material joining section), a second substrate material supply adjusting section 18, a substrate material recovery section 19, a substrate material supply section 20, a chamber 21, a control section (not shown), and the like.

The substrate material supply adjusting section 13 includes a first conveyance roll 31 receiving a plastic substrate material 22 conveyed from the first line 11, and second, third, and fourth conveyance rolls 32, 33, 34 sequentially conveying the plastic substrate material 22 sent out from the first conveyance roll 31. The first conveyance roll 31 receiving the plastic substrate material 22 and the fourth conveyance roll 34 sending out the plastic substrate material 22 are fixed. The second and third conveyance rolls 32, 33 are configured to reciprocate simultaneously by the same distance in the direction intersected at almost a right angle with the direction in which the plastic substrate material 22 is conveyed. The first to fourth conveyance rolls 31, 32, 33, 34 convey the plastic substrate material 22 by rotating and coming into contact with the surfaces of the plastic substrate material 22. With this configuration, the substrate material supply adjusting section 13 sends out the substrate material after receiving and storing or while receiving it.

The substrate material conveying section 14 is disposed after the substrate material supply adjusting section 13, receives the plastic substrate material 22 conveyed from the first line 11 via the substrate material supply adjusting section 13, and conveys it to the second line 12 via the second substrate material supply adjusting section 18. The substrate material conveying section 14 includes first to fifth hold and conveyance roll pairs 41, 42, 43, 44, 45 for holding the to-be-conveyed plastic substrate material 22 from its respective sides. To one roll of the second hold and conveyance roll pair 42, an auxiliary conveyance roll 46 for supporting and conveying the plastic substrate material 22 is fixed so as to turn about the one roll as a center. The first to fifth hold and conveyance roll pairs 41, 42, 43, 44, 45 and the auxiliary conveyance roll 46 convey the plastic substrate 22 by rotating and coming into contact with the surfaces of the plastic substrate material 22.

The substrate material conveying section 14 may not hold the plastic substrate material 22 from its respective sides unlike the first to fifth hold and conveyance roll pairs 41, 42, 43, 44, 45 in the present example preferred embodiment. There may be a plurality of conveyance rolls provided only one side of the conveyance route so as to come into contact with only the surface on the non-processed side of the conveyed substrate material. Alternatively, for holding the plastic substrate material 22 from its respective sides like the first to fifth hold and conveyance roll pairs 41, 42, 43, 44, 45 in the present example preferred embodiment, the substrate material conveying section 14 may have a configuration to hold only the respective side end portions on the to-be-processed surface side of the plastic substrate material, or a configuration of a non-contact conveyance rolls blowing air to the to-be-processed surface of the substrate material.

The pre-stage substrate material dividing section 15 (a first substrate material dividing section and a third substrate material dividing section) is disposed after the first hold and conveyance roll pair 41. The pre-stage substrate material dividing section 15 has a function of aligning the conveyed plastic substrate material 22. The pre-stage substrate material dividing section 15 includes a dividing stage 50, a cutter disposed above the dividing stage 50, and the like. Rather than the cutter 51, a laser irradiating section, a high pressure water releasing section for releasing high pressure water, or the like may be provided above the dividing stage 50.

The post-stage substrate material dividing section 16 (a second substrate material dividing section) is provided after the third hold and conveyance roll pair 43. The post-stage substrate material dividing section 16 has a function of aligning the conveyed plastic substrate material 22. The post-stage substrate material dividing section 16 includes a dividing stage 60, a cutter 61 disposed above the dividing stage 60, and the like. Rather than the cutter 61, a laser irradiating section, a high pressure water releasing section for releasing high pressure water, or the like may be provided above the dividing stage 60.

The substrate material joining section 17 (a first substrate material joining section and a second substrate material joining section) is provided between the fourth hold and conveyance roll pair 44 and the fifth hold and conveyance roll pair 45. The substrate material joining section 17 has a function of aligning the conveyed plastic substrate material 22. The substrate material joining section 17 includes a joining stage 70, a joint tape attaching section 71 disposed above the joining stage 70, and the like. The joint tape attaching section 71 has a joint tape 72 having chemical resistance, heat resistance, or the like. In place of the joint tape attaching section 71, a fusing section for fusing the plastic substrate material 22 may be provided. The joint tape 72 may be attached to the reverse surface or both the surfaces of a substrate material. Examples of the adhesive material of the joint tape 72 include a material of which adhesiveness is lowered by a UV ray or heat, in addition to usual adhesive materials. In these cases, the substrate material dividing section may have a configuration including a UV ray irradiation section and a tape recovery mechanism or a configuration including a tape heating section and a tape recovery mechanism. With any of the above configurations, the mechanism can be simplified when compared with division by the cutter, thereby achieving a compact configuration. Hence, installation can be facilitated. In any of the configurations, a single substrate material dividing section movable within the equipment can serve as the first, second, and third substrate material dividing sections. As well, a single substrate material joining section movable within the equipment can serve as the first and second substrate material joining sections.

Alternatively, when multiple substrate material supply adjusting sections, multiple substrate material conveying sections, and a conveyance switching mechanism are provided, only one substrate material dividing section and only one substrate material joining section can suffice, or the substrate material dividing sections and the substrate material joining sections may be integrated. This can achieve a compact configuration.

The second substrate material supply adjusting section 18 includes a first conveyance roll 81 receiving the plastic substrate material 22 conveyed from the fifth hold and conveyance roll pair 45, and second, third, and fourth conveyance rolls 82, 83, 84 sequentially conveying the plastic substrate material 22 sent out from the first conveyance roll 81. The first conveyance roll 81 receiving the plastic substrate material 22 and the fourth conveyance roll 84 sending out the plastic substrate material 22 are arranged fixedly. The second and third conveyance rolls 82, 83 are configured to reciprocate simultaneously by the same distance in the direction intersected at almost a right angle with the direction in which the plastic substrate material 22 is conveyed. The first to fourth conveyance rolls 81, 82, 83, 84 convey the plastic substrate material 22 by rotating and coming into contact with the surfaces of the plastic substrate material 22. With the above configuration, the second substrate material supply adjusting section 18 sends out the substrate material after receiving and storing or while receiving it.

The above described first and second substrate material supply adjusting sections 13, 18 may include a plurality of conveyance rolls configured so as to come into contact with only the surface on the non-processed side of the conveyed substrate material. For example, the rolls on the to-be-processed side of the substrate material may be air blowing non-contacting conveyance rolls (suction rolls).

A meandering adjusting mechanism arranged to adjust meandering caused in conveying the substrate material may be provided at the first or second substrate material supply adjusting section 13, 18, or the substrate material conveying section 14.

Further, the second and third conveyance rolls 82, 83 may not be configured to be reciprocate by the same distance, and may reciprocate simultaneously and asymmetrically.

The substrate material recovery section 19 is provided after the second hold and conveyance roll pair 42 and above the conveyance route of the plastic substrate material 22. The substrate material recovery section 19 includes a plurality of guide rolls 85 receiving the plastic substrate material 22 and conveying it upward, and a winding roll 86 receiving the plastic substrate material 22 from the guide rolls 85 and winding and storing it. In the winding roll 86, a pinching section 87 is arranged to pinch and hold the start edge of the plastic substrate material 22 received from the guide roll 85.

The substrate material supply section 20 is provided between the second hold and conveyance roll pair 42 and the third hold and conveyance roll pair 43 and below the conveyance route of the plastic substrate material 22. The substrate material supply section 20 includes a reeling roll 88 arranged to reel and store the plastic substrate material 22 for supply to the conveyance route. The substrate material supply section 20 further includes a plurality of guide rolls 89 arranged to guide the plastic substrate material 22 supplied from the winding roll 88 to the conveyance route.

The substrate material recovery section 19 and the substrate material supply section 20 may be preferably arranged on the different sides of the conveyance route of the plastic substrate material 22. This arrangement may substantially eliminate interference between the substrate material recovery section 19 and the substrate material supply section 20, thereby implementing effective space utilization.

Figure 17:
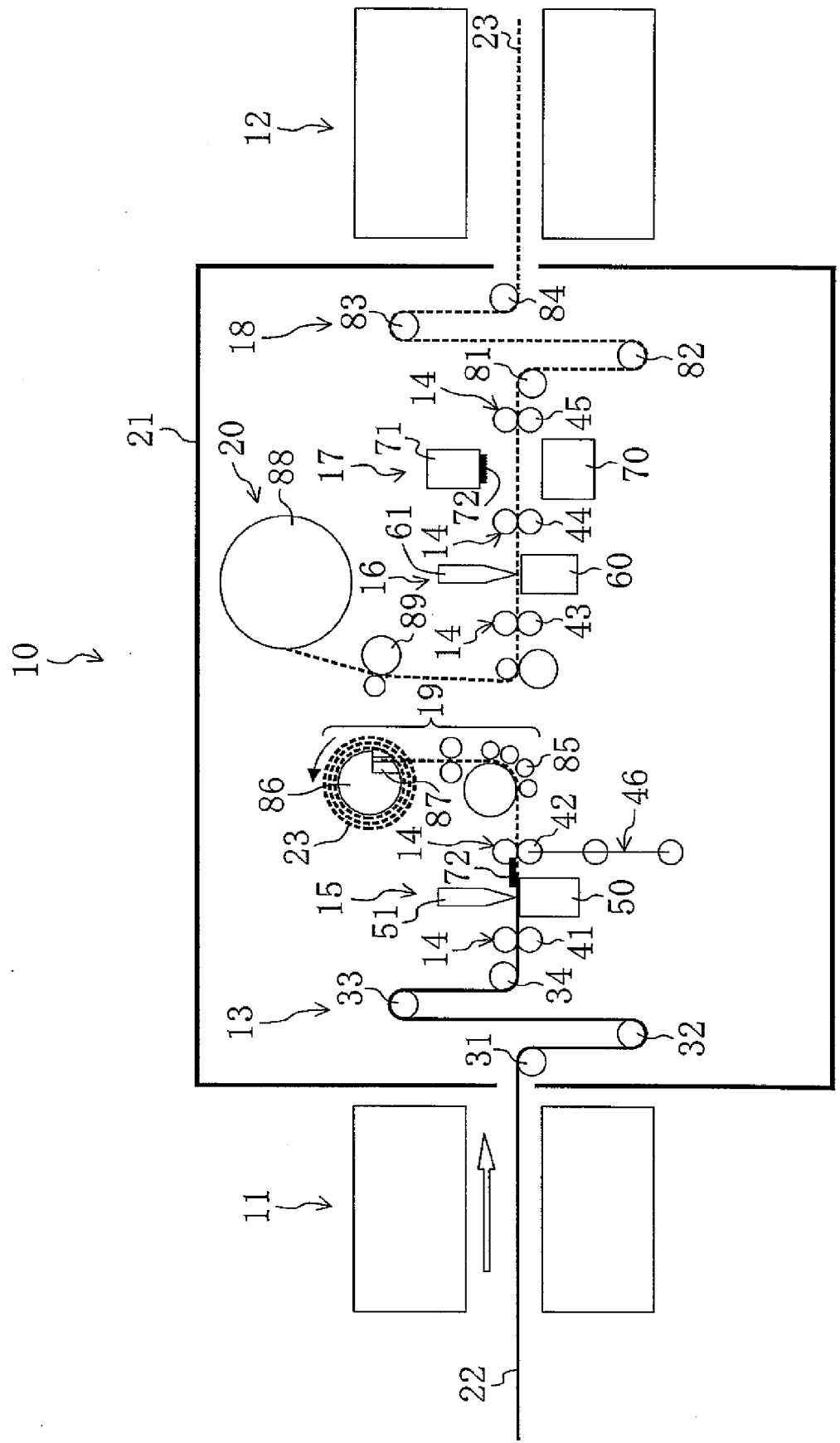
FIG. 17 is a schematic diagram of the substrate material processing equipment in which the substrate material recovery section and the substrate material supply section are arranged on the same side of the conveyance route of the plastic substrate material.

Alternatively, the substrate material recovery section 19 and the substrate material supply section 20 may be arranged on the same side of the conveyance route of the plastic substrate material 22, as shown in FIG. 17. In FIG. 17, the substrate material recovery section 19 and the substrate material supply section 20 are arranged above the pre-stage substrate material dividing section 15 and the post-stage substrate material dividing section 16.

The chamber 21 is provided for housing all of the first substrate material supply adjusting section 13, the substrate material conveying section 14, the pre-stage substrate material dividing section 15, the post-stage substrate material dividing section 16, the substrate material joining section 17, the second substrate material supply adjusting section 18, the substrate material recovery section 19, and the substrate material supply section 20. The inside of the chamber 21 is set at almost an air pressure atmosphere. The inside of the chamber 21 may be sealed and have a purging function, a suction function, or the like according to a desired processing condition.

The substrate material processing equipment 10 may include a cleaning section for cleaning the plastic substrate material 22 after at least one of the pre-stage substrate material dividing section 15 and the post-stage substrate material dividing section 16.

In addition, in the substrate material processing equipment 10, at least one of the pre-stage substrate material dividing section 15 and the post-stage substrate material dividing section 16 may include a position detector arranged to detect a substrate material division point.

Each of the line configurations of the first line, the second line, and the like may be formed with at least one apparatus, and may be configured to have a plurality of apparatuses connected according to needs.

Display Device Manufacturing Method Using Substrate Material Processing Equipment 10

A method for manufacturing a display device with the use of the substrate material processing equipment 10, in accordance with an example preferred embodiment of the present invention will be described next in detail.

As shown in FIG. 1, the continuous plastic substrate material 22 (a flexible substrate material) of which one surface is coated with a film is conveyed from the first line 11 (e.g., an exposure line) to the second line 12 (e.g., an etching line), and the substrate material processing equipment 10 is provided between the first line 11 and the second line 12. The present example preferred embodiment refers to a manufacturing method in the case where only the first line 11 is stopped for maintenance in advance, and, only the second 12 is then stopped for maintenance.

First, as shown in FIG. 1, the plastic substrate material 22, which is a to-be-processed continuous substrate material made of polyimide and having a thickness of, for example, about 100 μm and a width of about 105 mm, is conveyed to the substrate material processing equipment 10 from the first line 11, and is conveyed to the second line 12 via the substrate supply adjusting section 13, the substrate material conveying section 14, the pre-stage substrate material dividing section 15, the post-stage substrate material dividing section 16, the substrate material joining section 17, and the second substrate material supply adjusting section 18.

Figure 2:
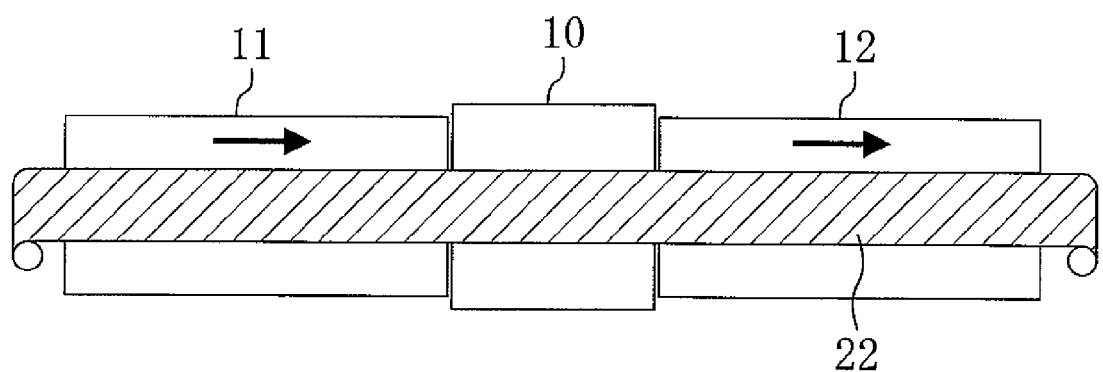
FIG. 2 is a schematic diagram showing the type of a substrate material conveyed through the first line, the substrate material processing equipment, and the second line in the step shown in FIG. 1.

FIG. 2 is a schematic diagram showing the type of the substrate material conveyed through the first line 11, the substrate material processing equipment 10, and the second line 12 in the step shown in FIG. 1. In FIG. 2, only the plastic substrate material 22 to be processed is conveyed through the first line 11, the substrate material processing equipment 10, and the second line 12. In this time, the first and second lines 11, 12 are operated to perform predetermined processes on the plastic substrate material 22.

Figure 3:
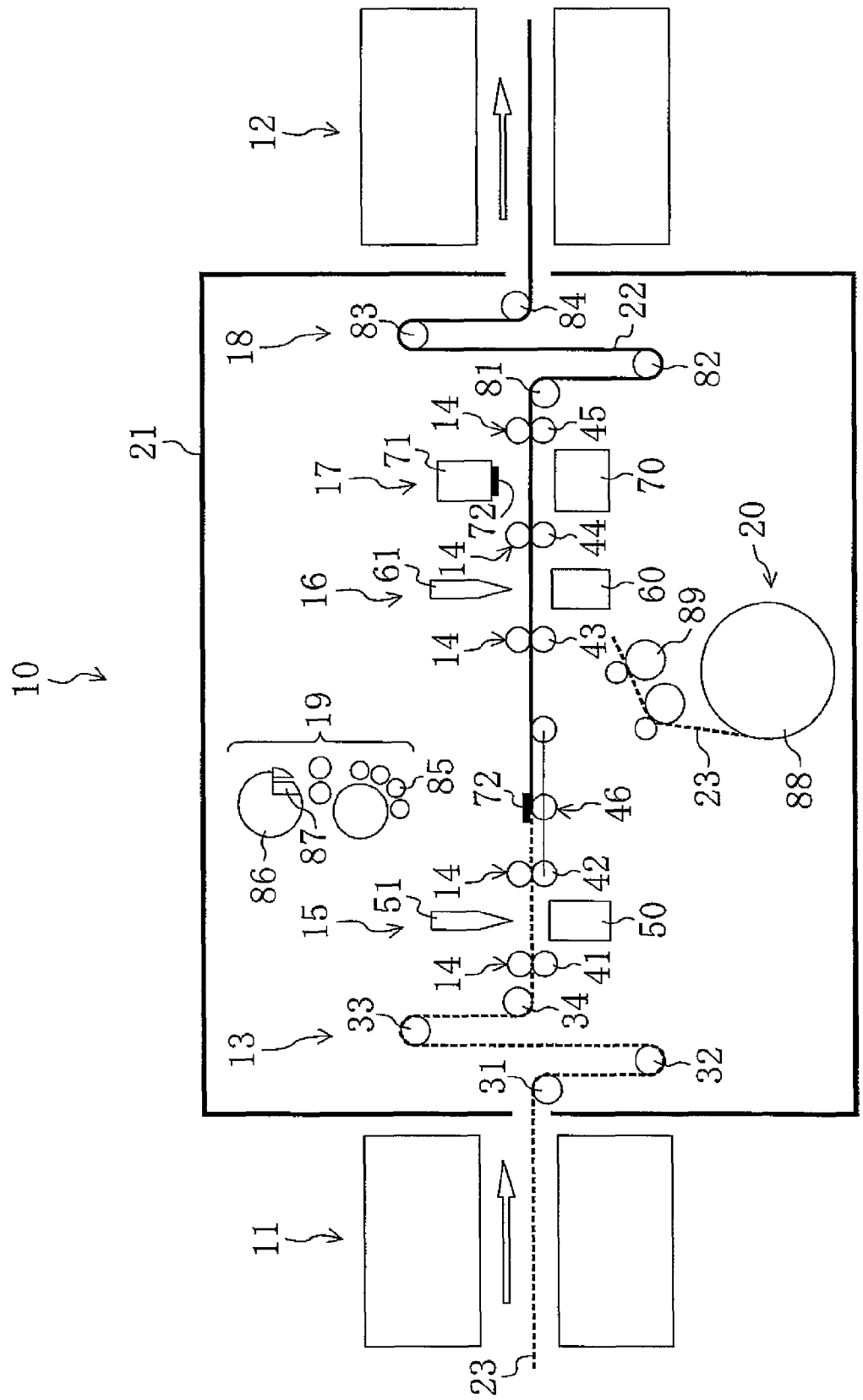
FIG. 3 is a schematic diagram of the substrate material processing equipment when a predetermined process is finished in only the first line with the first and second lines being operating.

Next, as shown in FIG. 3, while the first line 11 and the second line 12 are operated, only the predetermined process of the first line 11 is stopped. Then, a continuous dummy substrate material 23 having the same size or substantially the same size (for example, about 100 μm thick and about 105 mm width in the present example preferred embodiment) as the plastic substrate material 22 and made of polyimide is joined to the end edge of the to-be-processed plastic substrate material 22, and is conveyed. Here, the dummy substrate material 23 may be a flexible substrate material prepared separately from the to-be-processed plastic substrate material 22, or a defective substrate material made of the same material as the to-be-processed plastic substrate material 22 but having a scratch or the like. Alternatively, a plastic substrate material 22 with no defect, such as a scratch may be used, of course.

The dummy substrate material 23 joined to the end edge of the to-be-processed plastic substrate material 22 is conveyed to the substrate material processing equipment 10 by the operation of the first and second lines 11, 12. In this time, the first and second substrate material supply adjusting sections 13, 18 work so that the conveyance speed of the plastic substrate material 22 to the second line 12 is constant.

Figure 4:
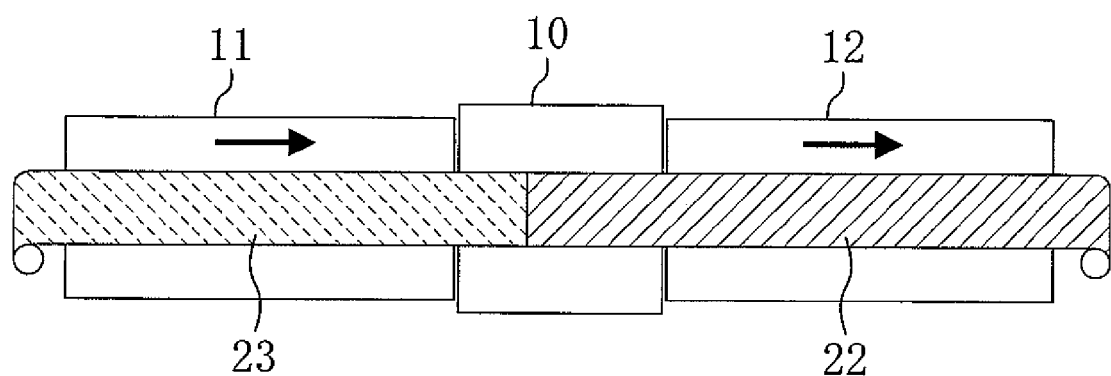
FIG. 4 is a schematic diagram showing the types of substrate materials conveyed through the first line, the substrate material processing equipment, and the second line in the step shown in FIG. 3.

FIG. 4 is a schematic diagram showing the types of the substrate materials conveyed through the first line 11, the substrate material processing equipment 10, and the second line 12 in the step shown in FIG. 3. In FIG. 4, the dummy substrate material 23 reaches the middle of the substrate material processing equipment 10 in the route from the first line 11, and the to-be-processed plastic substrate material 22 joined to the start edge of the dummy substrate material 23 lies from there to the second line 12.

Figure 5:
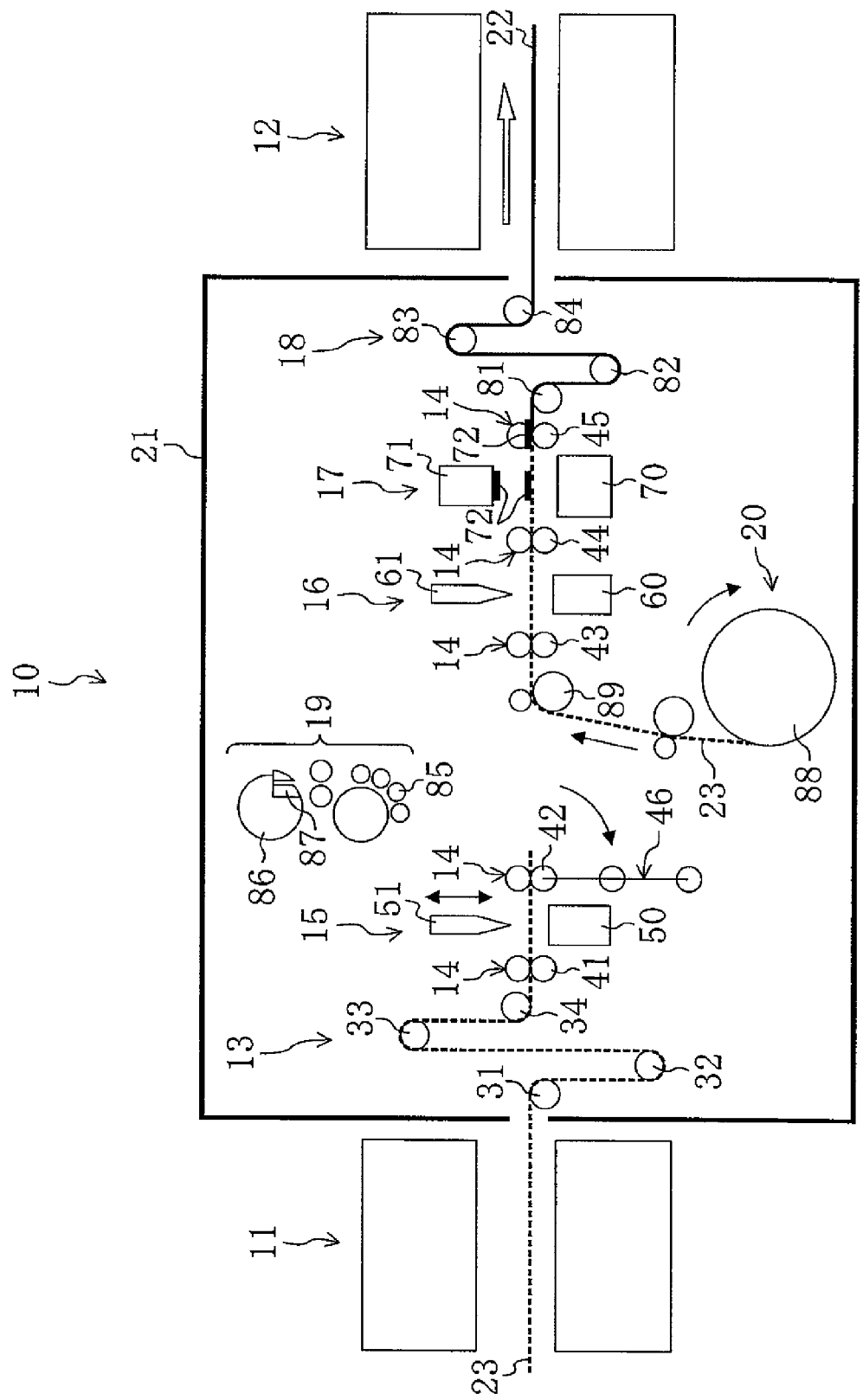
FIG. 5 is a schematic diagram of the substrate material processing equipment when maintenance on the first line starts with the operation of the first line stopped.

Subsequently, when the dummy substrate material 23 is conveyed to the pre-stage substrate material dividing section 15, it is divided at its predetermined point. Thereafter, the operation of the first line 11 is stopped, as shown in FIG. 5, for starting maintenance on the first line 11. The second line 12 is operated continuously, so that the plastic substrate material 22 is conveyed to the second line 12. At this time, the auxiliary conveyance roll 46 fixed to the one roll of the second hold and conveyance roll pair 42 turns about the one roll as a center to move downward. At the same time as the movement of the auxiliary conveyance roll 46, the guide rolls 89 of the substrate material supply section 20 move upward, so that the continuous dummy substrate material 23, which has the same size or substantially the same size (for example, about 100 μm thickness and about 105 mm width in the present example preferred embodiment) as the to-be-processed plastic substrate material 22 and is made of polyimide, is conveyed through the guide rolls 89 toward the end edge of the dummy substrate material 23 which is formed by division.

Thereafter, the start edge of the dummy substrate material 23 conveyed from the substrate material supply section 20 is joined to the end edge of the dummy substrate material 23 which is formed by division, with the use of the joint tape 72 of the substrate material joining section 17. At this time, the second substrate material supply adjusting section 18 is operated so that the conveyance speed of the plastic substrate material 22 to the second line 12 is constant.

Figure 6:
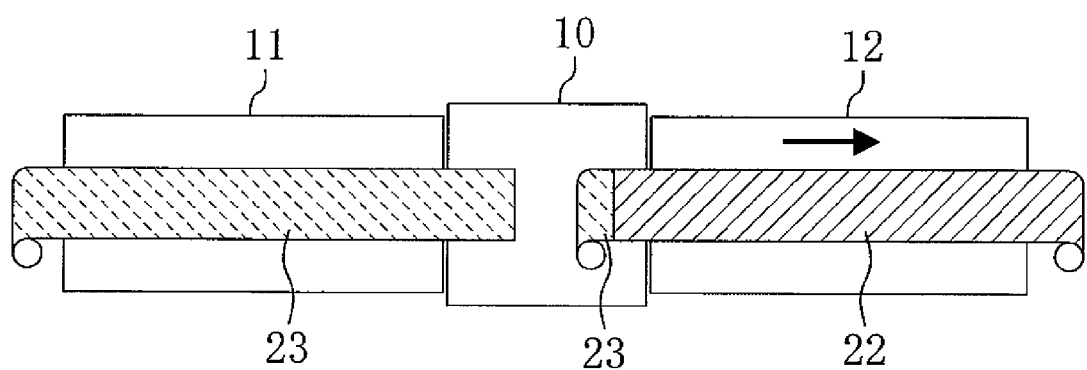
FIG. 6 is a schematic diagram showing the types of substrate materials conveyed through the first line, the substrate material processing equipment, and the second line in the step shown in FIG. 5.

FIG. 6 is a schematic diagram showing the types of the substrate materials conveyed through the first line 11, the substrate material processing equipment 10, and the second line 12 in the step shown in FIG. 5. In FIG. 6, the dummy substrate material 23 reaches and is divided at the middle of the substrate material processing equipment 10 in the route from the first line 11. The dummy substrate 23 from the substrate material supply section 20 extends to the vicinity of the substrate material joining section 17 in the substrate material processing equipment 10. The to-be-processed plastic substrate material 22 joined to the start edge of the dummy substrate material 23 extends from there to the second line 12.

Figure 7:
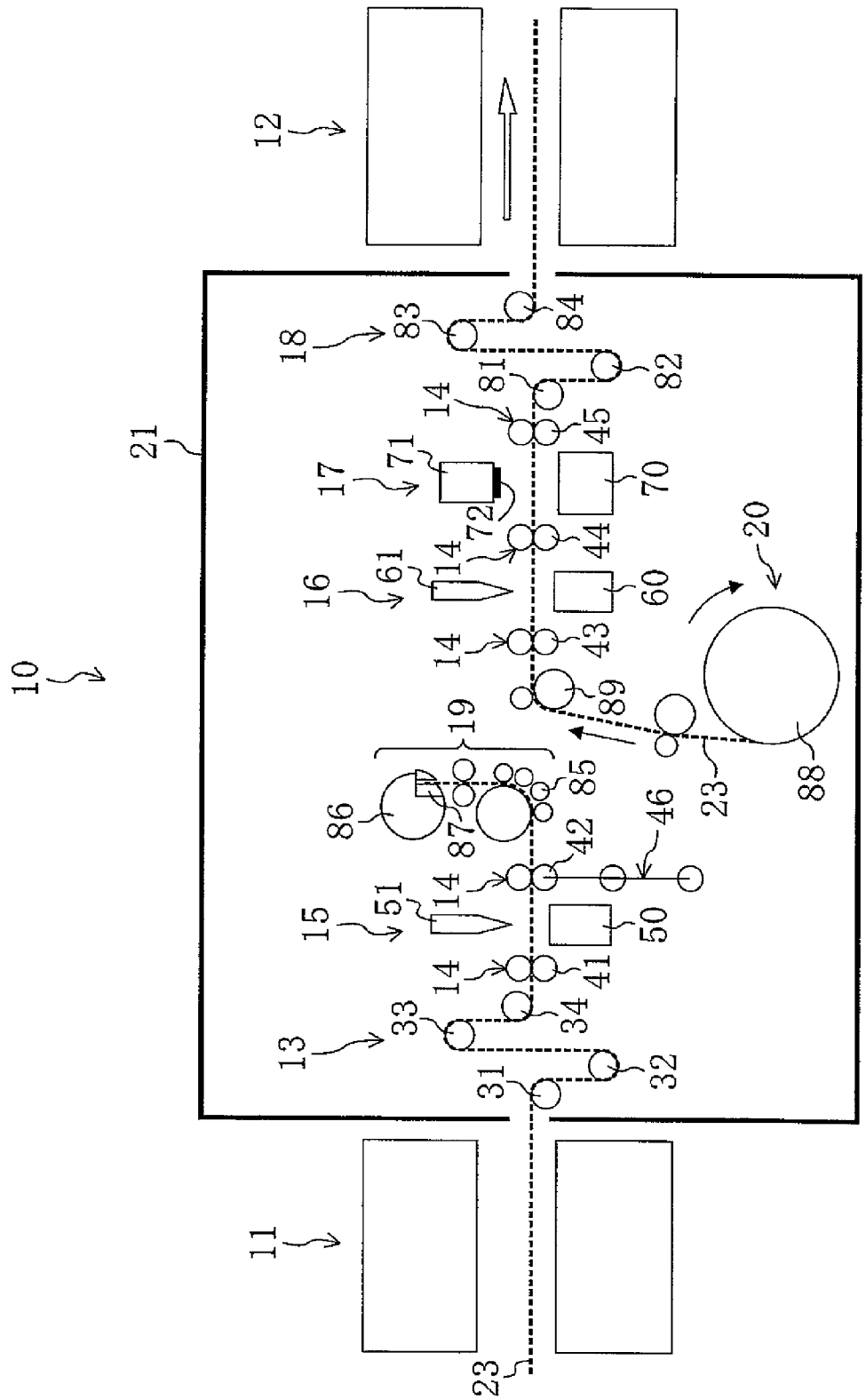
FIG. 7 is a schematic diagram of the substrate material processing equipment when the second line is under preparation for maintenance, while the first line is under maintenance.

Next, as shown in FIG. 7, the substrate material recovery section 19 descends. The descending substrate material recovery section 19 pulls up the start edge of the dummy substrate material 23, which is formed by division by the pre-stage substrate material dividing section 15, into the pinching section 87 through the guide rolls 85, and pinches and holds it. During this time, the substrate material supply adjusting section 13 sends out the dummy substrate material 23 toward the substrate material recovery section 19 in a manner that the second and third conveyance rolls 32, 33 move in the direction reducing the distance therebetween. The plastic substrate material 22 and the dummy substrate material 23 lie in the second line 12, and a predetermined process is performed until conveyance of the plastic substrate material 22 is finished. During this time, the dummy substrate material 23 from the substrate material supply section 20 is being conveyed to the second line 12.

Figure 8:
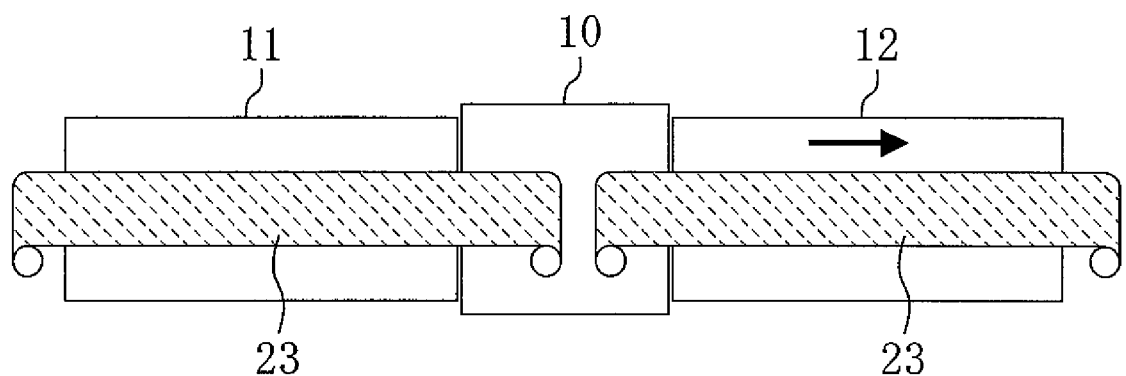
FIG. 8 is a schematic diagram showing the types of the substrate materials conveyed through the first line, the substrate material processing equipment, and the second line in the step shown in FIG. 7.

FIG. 8 is a schematic diagram showing the type of the substrate materials conveyed through the first line 11, the substrate material processing equipment 10, and the second line 12 in the step shown in FIG. 7. In FIG. 8, all the substrate materials lying on the first line 11, the substrate material processing equipment 10, and the second line 12 are the dummy substrate materials 23.

Figure 9:
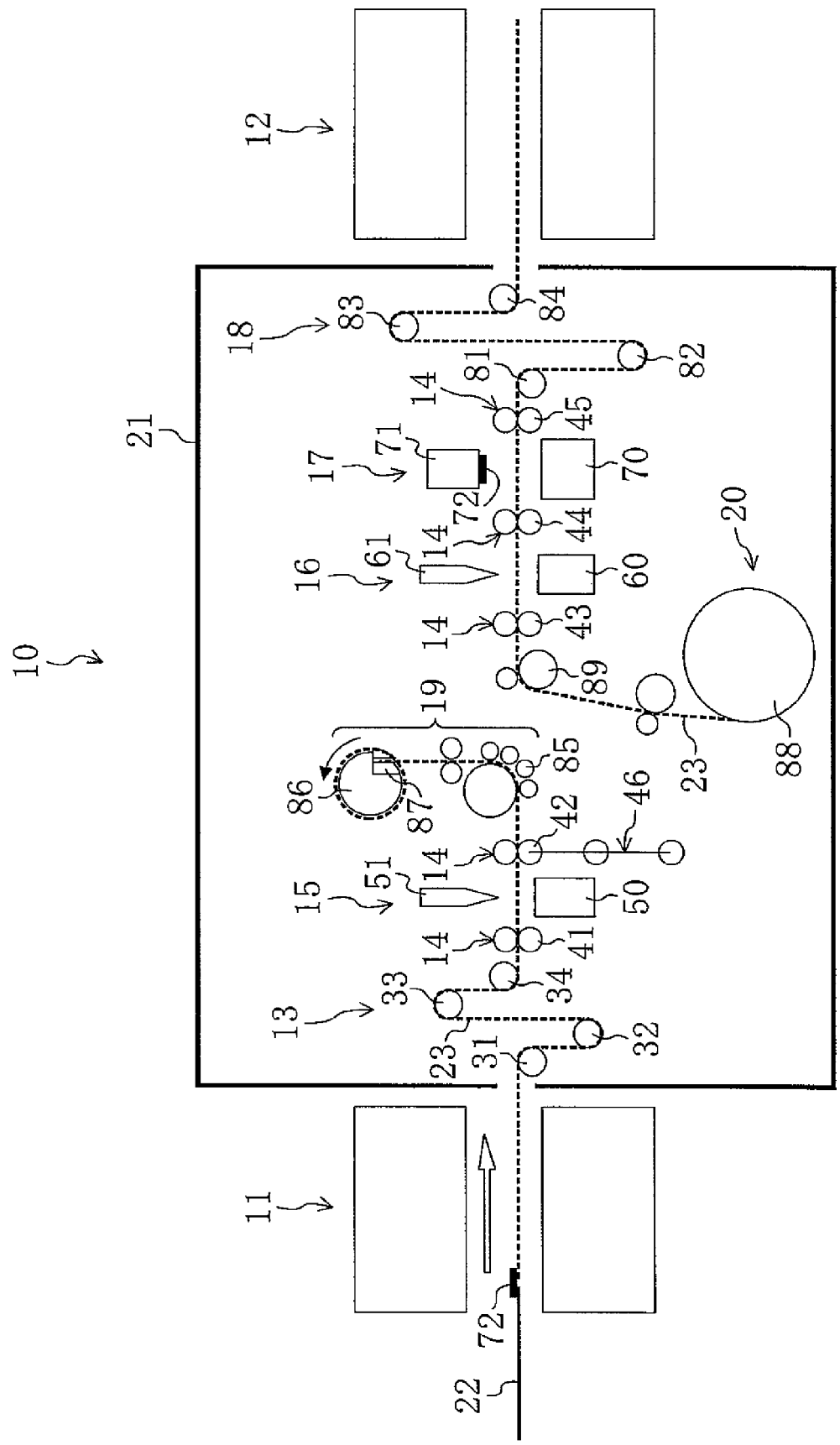
FIG. 9 is a schematic diagram of the substrate material processing equipment when maintenance on the first line is finished, and maintenance on the second line starts.

Subsequently, after the maintenance on the first line 11 is finished, a to-be-processed plastic substrate material 22 is joined to the end edge of the dummy substrate material 23 on the first line 11, and the operation of the first line 11 is started again, as shown in FIG. 9. At this time, the substrate material recovery section 19 moves upward while recovering the dummy substrate material 23 by the winding roll 86. At about the same time, the substrate material supply section 20 stops supplying the dummy substrate material 23, and the operation of the second line 12 is stopped for starting maintenance on the second line 12.

Figure 10:
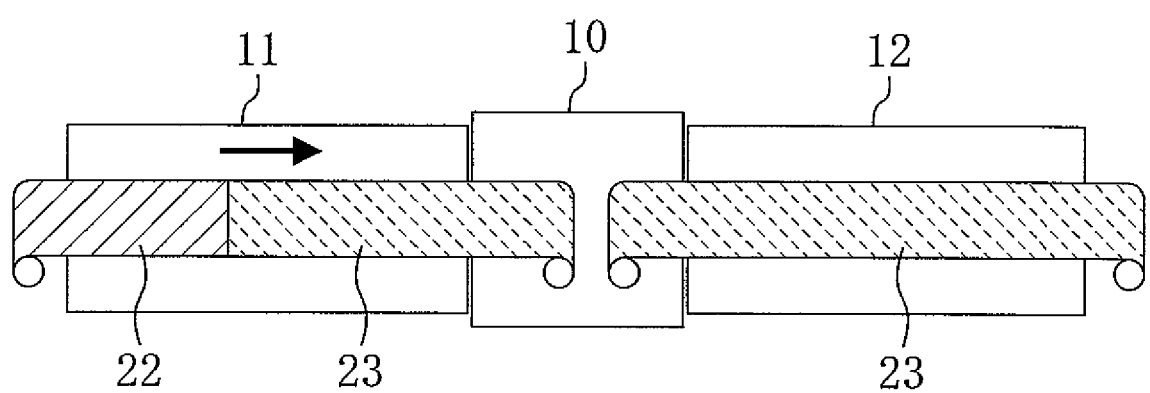
FIG. 10 is a schematic diagram showing the types of the substrate materials conveyed through the first line, the substrate material processing equipment, and the second line in the step shown in FIG. 9.

FIG. 10 is a schematic diagram showing the types of the substrate materials conveyed through the first line 11, the substrate material processing equipment 10, and the second line 12 in the step shown in FIG. 9. In FIG. 10, the dummy substrate material 23 and the to-be-processed plastic substrate material 22 joined to the dummy substrate material 23 lie on the first line 11, and all the substrate materials lying on the substrate material processing equipment 10 and the second line 12 are the dummy substrate materials 23.

Figure 11:
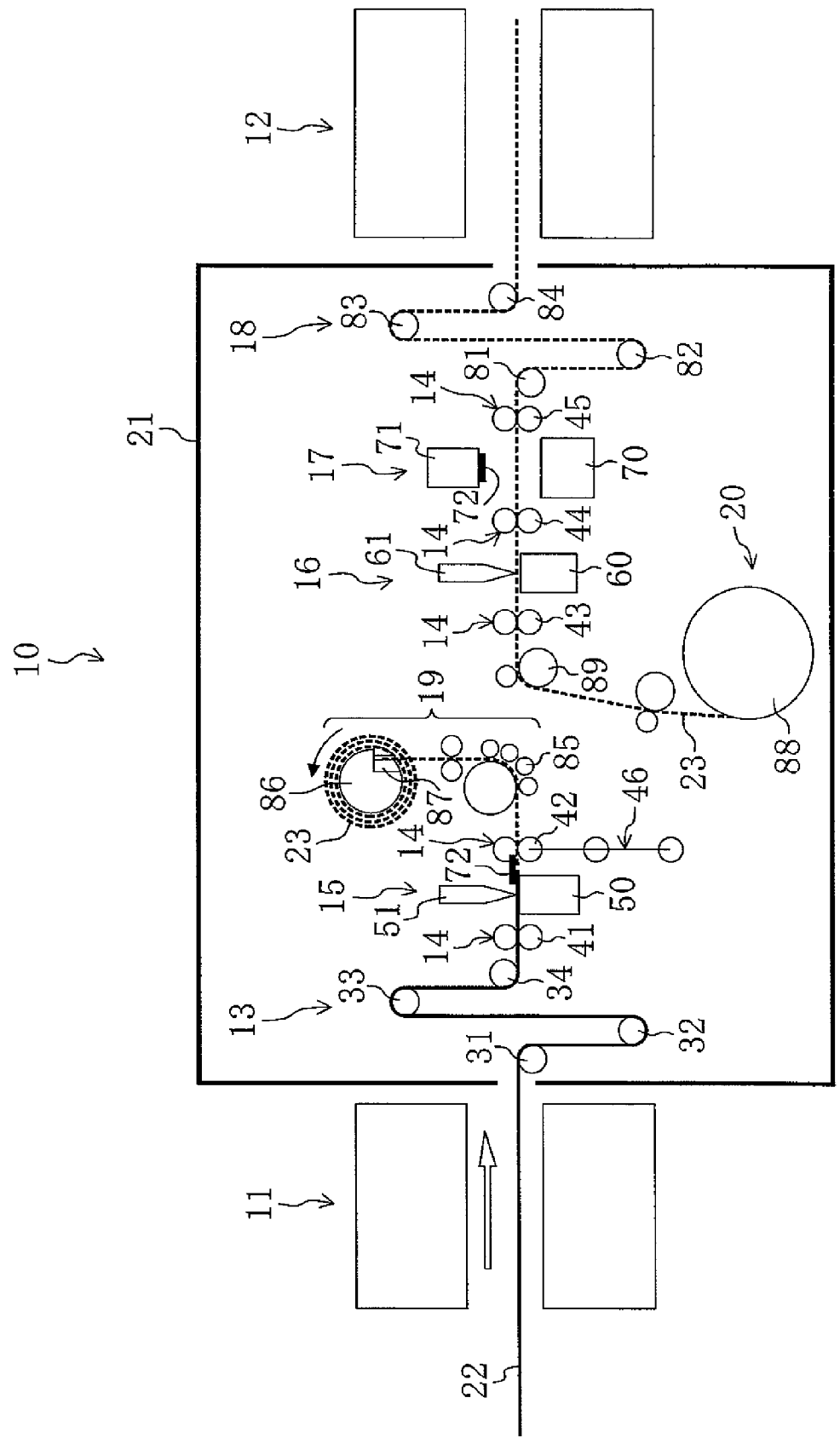
FIG. 11 is a schematic diagram of the substrate material processing equipment when the first line is operated to perform the predetermined processing, while the second line is under maintenance.

As the substrate material recovery section 19 continues recovering the dummy substrate materials 23, the to-be-processed plastic substrate material 22 is conveyed from the first line 11 into the substrate material processing equipment 10, as shown in FIG. 11. Thereafter, the substrate material recovery section 19 stops recovering the dummy substrate material 23 when the plastic substrate material 22 reaches a division point of the pre-stage substrate material dividing section 15, and the substrate material supply adjusting section 13 stores the plastic substrate material 22 for continuous conveyance of the plastic substrate material 22 from the first line 11. Then, the plastic substrate material 22 is divided at its predetermined division point. As well, the post-stage substrate material dividing section 16 divides the dummy substrate material 23 at its predetermined division point. During this time, the second line 12 is still under maintenance.

Figure 12:
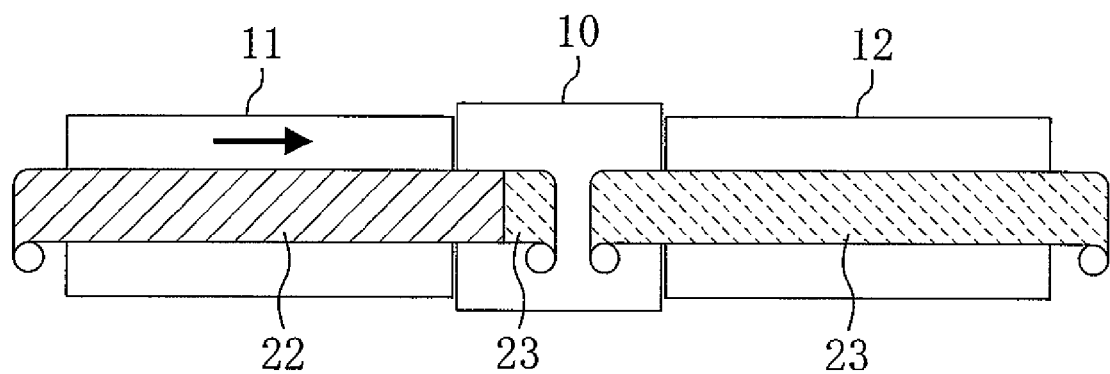
FIG. 12 is a schematic diagram showing the types of the substrate materials conveyed through the first line, the substrate material processing equipment, and the second line in the step shown in FIG. 11.

FIG. 12 is a schematic diagram showing the types of the substrate materials conveyed through the first line 11, the substrate material processing equipment 10, and the second line 12 in the step shown in FIG. 11. In FIG. 12, the to-be-processed plastic substrate material 22 lies on the first line 11. The plastic substrate material 22 joined to the dummy substrate material 23 recovered in the substrate material recovery section 19 and the dummy substrate material 23 supplied from the substrate material supply section 20 lie in the substrate material processing equipment 10. Only the dummy substrate materials 23 lies on the second line 12.

Figure 13:
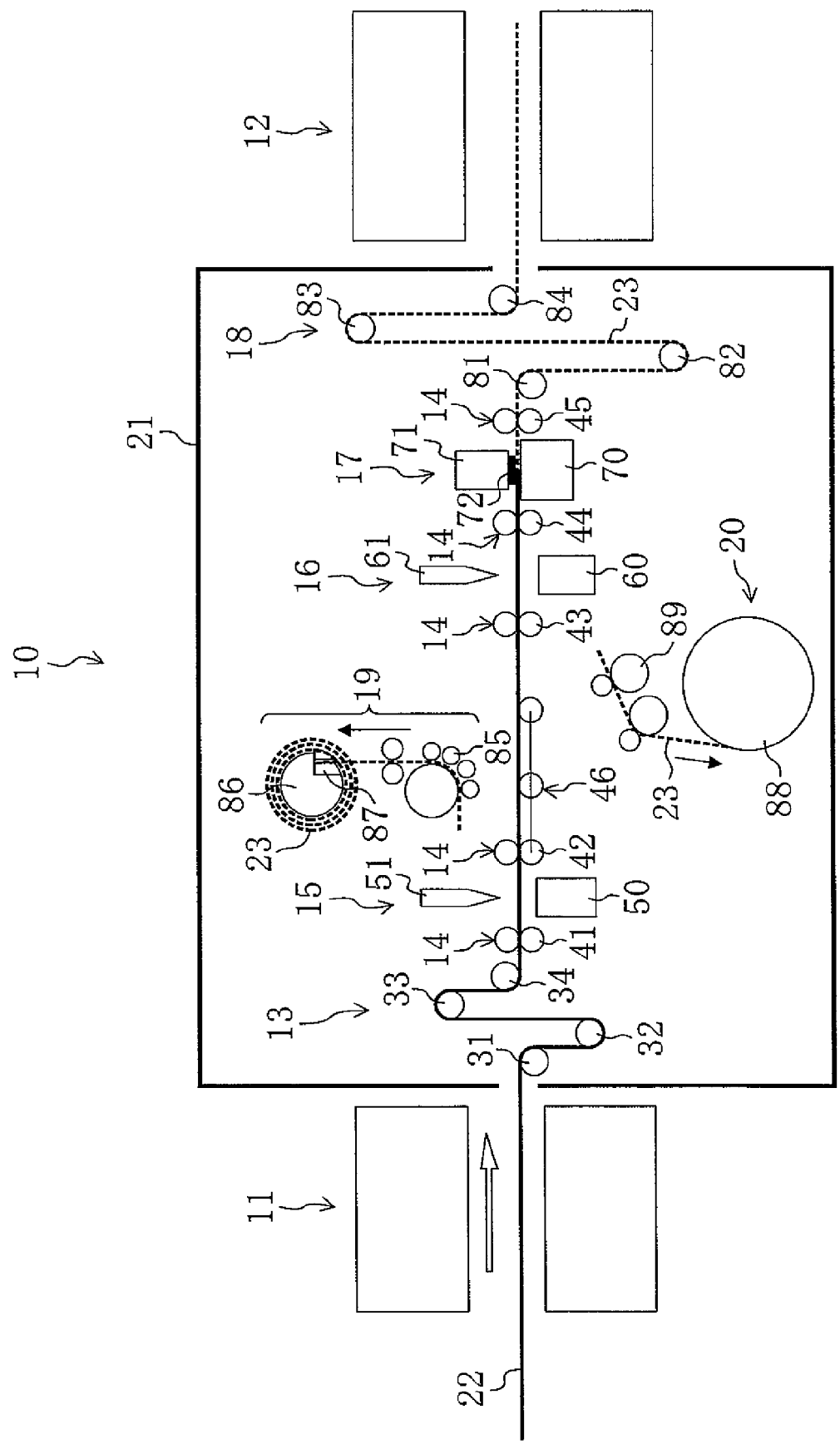
FIG. 13 is a schematic diagram of the substrate material processing equipment when a substrate material recovery section and a substrate material supply section are away from a conveyance route to original locations.

Thereafter, as shown in FIG. 13, the substrate material recovery section 19 and the substrate material supply section 20 move away from the conveyance route to the original locations, and the auxiliary conveyance roll 46 moves upward and turns about the one roll of the second hold and conveyance roll pair 42 as a center, thereby returning to the same horizontal level as the second hold and conveyance roll pair 42 for forming the conveyance route of the plastic substrate material 22. The to-be-processed plastic substrate material 22 is continuously conveyed from the operated first line 11 into the substrate material processing equipment 10. The second substrate material supply adjusting section 18 stores and conveys the dummy substrate material 23 so that the end edge of the dummy substrate material 23 which is formed by division by the post-stage substrate material dividing section 16 reaches a joint point of the substrate material joining section 17. In addition, the plastic substrate material 22 from the first line 11 is conveyed, and its start edge formed by division by the pre-stage substrate material dividing section 15 is joined to the end edge of the dummy substrate material 23 reaching the joint point of the second substrate joining section 17, with the use of the joint tape 72.

Figure 14:
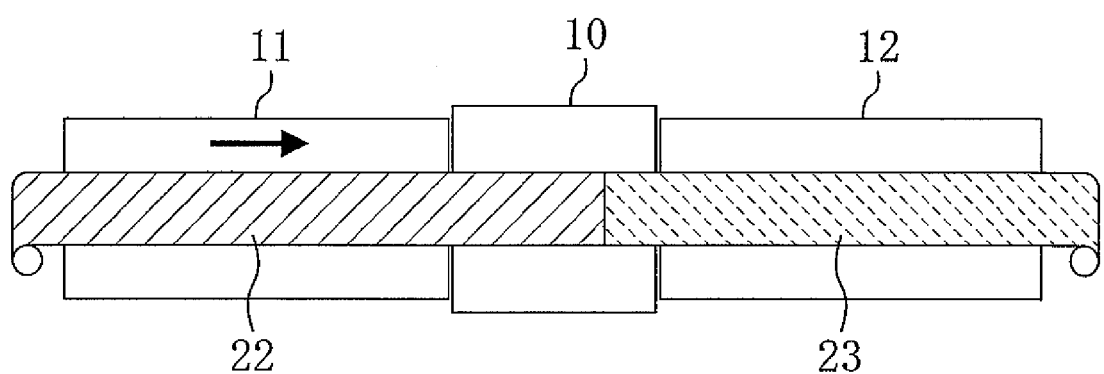
FIG. 14 is a schematic diagram showing the types of the substrate materials conveyed through the first line, the substrate material processing equipment, and the second line in the step shown in FIG. 13.

FIG. 14 is a schematic diagram showing the types of the substrate materials conveyed through the first line 11, the substrate material processing equipment 10, and the second line 12 in the step shown in FIG. 13. In FIG. 14, the to-be-processed plastic substrate material 22 lies on the first line 11. The plastic substrate material 22 lies up to the second substrate material joining section 17 in the substrate material processing equipment 10. The dummy substrate material 23 lies thereafter in the substrate material processing equipment 10. The substrate material lying on the second line 12 is only the dummy substrate material 23.

Figure 15:
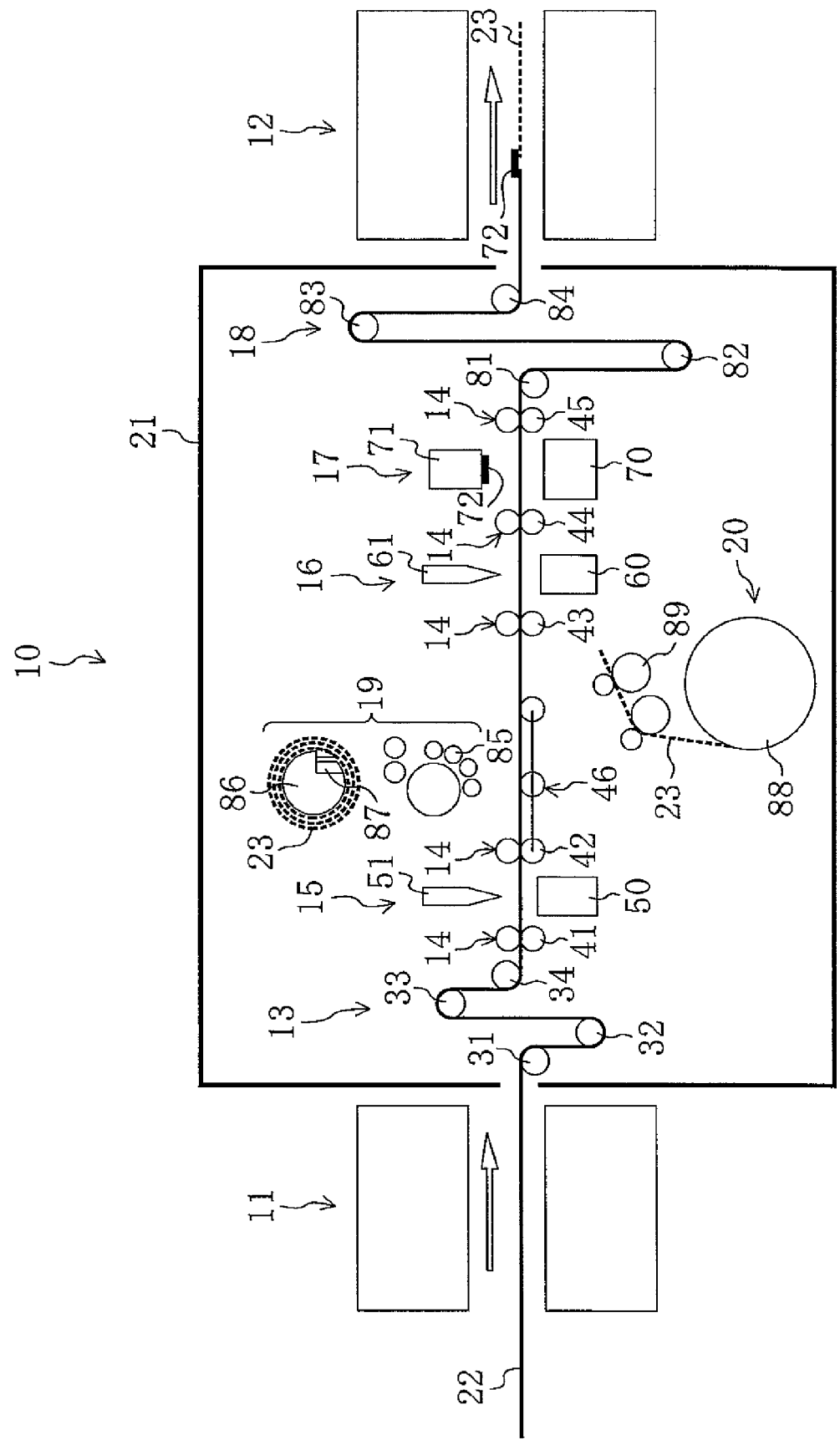
FIG. 15 is a schematic diagram of the substrate material processing equipment when the second line starts its operation after maintenance, while the first line is operated to perform the predetermined processing.

Next, as shown in FIG. 15, the maintenance on the second line 12 is finished, and the second line 12 is operated to start the predetermined process again. The substrate material recovery section 19 recovers fully the dummy substrate material 23 by winding it up by the winding roll 86. The dummy substrate material 23 is conveyed to the second line 12. In the substrate material processing equipment 10, the plastic substrate material 22 having processed in the first line 11 is conveyed continuously. Thus, the first line 11, the substrate material processing equipment 10, and the second line 12 return to the original operation states shown in FIG. 1.

Figure 16:
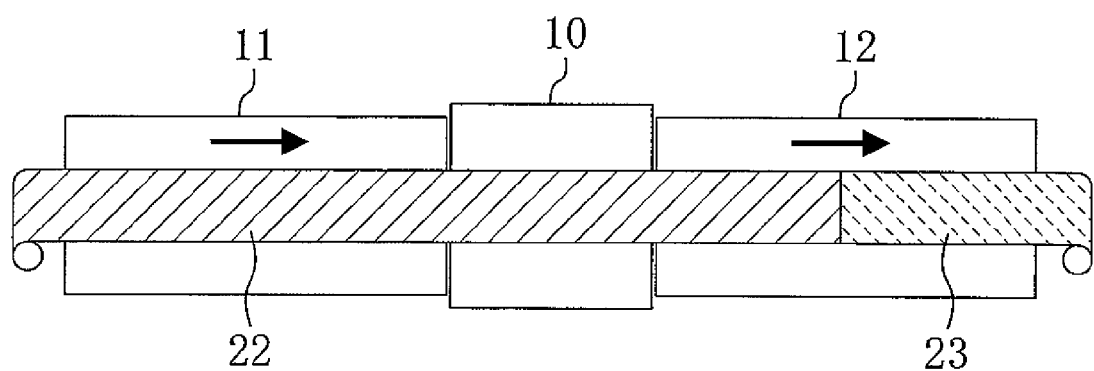
FIG. 16 is a schematic diagram showing the types of the substrate materials conveyed through the first line, the substrate material processing equipment, and the second line in the step shown in FIG. 15.

FIG. 16 is a schematic diagram showing the types of the substrate materials conveyed through the first line 11, the substrate material processing equipment 10, and the second line 12 in the step shown in FIG. 15. In FIG. 16, the to-be-processed plastic substrate material 22 lies from the first line 11 to the middle of the second line 12 via the substrate material processing equipment 10, and the dummy substrate material 23 lies thereafter.

Thus, maintenance is performed on a plurality of production lines with the lines stopped one after another, with a result that the plastic substrate material 22 can be processed with the lines operated efficiently for manufacturing a display device.

The plastic substrate material is preferably used herein as a flexible substrate material, but the flexible substrate material may be an organic substrate material made of, for example, polyester sulphone (PES), polyethylene naphthaleate (PEN), polyimide (PI), polycarbonate (PC), polyacrylate (PA), and polyethylene naphtarate (PET), a metal foil substrate material made of, for example, stainless, inconel, invar, and the like, an organic/inorganic composite substrate material, and the like.

The dummy substrate material made of polyimide is preferably used as a second flexible substrate material in the above example preferred embodiment, but the second flexible substrate material may be any substrate material as long as it has flexibility, such as an organic substrate material, an inorganic/organic composite substrate material, a metal foil substrate material, and the like.

Other Example Preferred Embodiments

As other example preferred embodiments of the substrate material processing method using the substrate material processing equipment 10 in accordance with the present invention, a description will be given next of substrate material processing methods in the case (A) where trouble occurs in the second line 12, and in the case (B) where trouble occurs in the first line 11.

(A) Substrate Processing Method Upon Occurrence of Trouble in Second Line 12

If the second line 12 and the conveyance of the to-be-processed plastic substrate material 22 to the second line 12 must be stopped upon occurrence of trouble in the second line 12, the plastic substrate material 22 conveyed from the first line 11 is divided in the pre-stage substrate material dividing section 15 first.

Next, the substrate material recovery section 19 recovers the plastic substrate material 22 continuously conveyed through the first line 11 from its start edge. In this time, the substrate material supply section 20 supplies the dummy substrate material 23 to the end edge of the plastic substrate material 22 that is being conveyed to the second line 12.

Subsequently, the substrate material joining section 17 joins the start edge of the dummy substrate material 23 supplied from the substrate material supply section 20 to the end edge of the plastic substrate material 22 which is formed by division for continuous conveyance. When the dummy substrate material 23 advances up to a predetermined point in the route, the second line 12 and conveyance of the plastic substrate material 22 to the second line 12 are stopped. Thus, the second line 12 in which trouble occurs and conveyance of the plastic substrate material 22 to the second line 12 can be stopped, while at the same time the plastic substrate material 22 can be continuously conveyed from the first line 11.

If the trouble is overcome within a short period of time, it is possible that the plastic substrate material 22 from the first line 11 is joined to the dummy substrate material and is conveyed continuously without conveyance interruption.

(B) Substrate Processing Method Upon Occurrence of Trouble in First Line 11

Upon occurrence of trouble in the first line 11, the first line 11 and conveyance of the plastic substrate 22 from the first line 11 are stopped first.

Next, the pre-stage substrate material dividing section 15 divides the plastic substrate material 22 conveyed from the first line 11. In the case where the trouble in the first line 11 forms a process failure point in the plastic substrate material 22, the position detector provided in the pre-stage dividing section 15 detects a point immediately before the processing failure point as a division point, and then, the pre-stage substrate material dividing section 15 divides the conveyed plastic substrate material 22 at the point immediately before the process failure point. Accordingly, a portion of the plastic substrate material 22 which is processed normally can be efficiently conveyed to the second line 12.

Subsequently, the substrate material supply section 20 supplies another plastic substrate material 22 processed in advance in the first line 11 or another dummy substrate material 23 to the end edge of the plastic substrate material 22 which is formed by division.

Thereafter, the substrate material joining section 17 joins the start edge of the other plastic substrate material 22 or dummy substrate material 23 supplied from the substrate material supply section 20 to the end edge of the plastic substrate material 22 which is formed by division, for conveyance to the second line 12.

Hence, if trouble occurs in, for example, the first line 11, the plastic substrate material 22 can be conveyed continuously to the second line 12, while at the same time the first line 11 and conveyance of the plastic substrate material 22 from the first line 11 to the second line 12 can be stopped.

Thus, the substrate material processing equipment 10 can be used effectively for substrate material processing even upon occurrence of trouble, as well as in maintenance on the first line 11 or the second line 12.

The substrate material processing equipment 10 in accordance with a preferred embodiment of the present invention can be used effectively in manufacturing a display device, such as an LCD (liquid crystal display panel), a PD (plasma display panel), an organic EL (organic electroluminescence), an SED (surface-conduction electron-emitter display), or the like. Other than the display devices, any articles may be manufactured as long as they are manufactured by processing a flexible material conveyed in a roll to roll format.

OPERATION AND ADVANTAGES

The substrate material processing equipment in accordance with preferred embodiments of the present invention is substrate material processing equipment provided between a first line and a second line performing predetermined processes on a continuous flexible substrate material. The equipment includes: a substrate material conveying section configured to receive from the first line and convey to the second line a to-be-processed first substrate material and/or a second flexible substrate material joined to the first flexible substrate material; a first substrate material dividing section configured to divide the first or second flexible substrate material conveyed by the substrate material conveying section from the first line; a substrate material recovery section configured to recover the first or second flexible substrate material from an end edge thereof which is formed by division by the first substrate material dividing section; a substrate material supply section configured to supply the first or second flexible substrate material to an end edge of the substrate material which is formed by division by the first substrate material dividing section; a first substrate material joining section configured to join the end edge of the substrate material to a start edge of the substrate material supplied from the substrate material supply section; a second substrate material dividing section provided between the substrate material supply section and the second line, and configured to divide the first or second flexible substrate material; a third substrate material dividing section provided between the first line and the substrate material recovery section, and configured to divide the first or second flexible substrate material in midstream of recovery by the substrate material recovery section; and a second substrate material joining section configured to join a start edge of the first or second flexible substrate material which is formed by division by the third substrate material dividing section to an end edge of the first or second flexible substrate material which is formed by division by the second substrate material dividing section.

In the above configuration, in conveying a to-be-processed flexible substrate material from the first line to the second line, for example, a dummy substrate material (a separately prepared flexible substrate material, or a defective flexible substrate material made of the same material but having a defect such as a scratch or the like, rather than the to-be-processed substrate material) from the first line is joined as the second flexible substrate material to the flexible substrate material. When the dummy substrate material is conveyed to the substrate material processing equipment, the first substrate material dividing section divides the dummy substrate material. Next, the dummy substrate material is recovered by the substrate material recovery section from its start edge formed by division, and a separately prepared dummy substrate material is supplied by the substrate material supply section and is joined to the end edge of the dummy substrate material which is formed by division. Accordingly, in this time, the first line can be stopped for starting maintenance, while the separately prepared dummy substrate material can be continuously conveyed from the substrate material supply section to the second line. Hence, the second line can be operated without stopping.

When the maintenance on the first line is finished, the to-be-processed flexible substrate material is joined to the end edge of the dummy substrate material conveyed to the substrate material processing equipment from the first line, and the operation of the first line is started. In this time, the substrate material recovery section recovers the dummy substrate material conveyed from the first line. When the first line starts its operation, then, maintenance on the second line starts with the operation of the second line stopped.

Subsequently, according to the progress of the maintenance on the second line, the second substrate material dividing section divides the dummy substrate material conveyed from the substrate material supply section, and the third substrate material dividing section divides the to-be-processed flexible substrate material joined to the end edge of the dummy substrate material conveyed from the first line at the vicinity of the joint point.

Next, the start edge of the flexible substrate material which is formed by division by the third substrate material dividing section is joined to the end edge of the dummy substrate material which is formed by division by the second substrate material dividing section. Then, the operation of the second line on which maintenance is finished starts so that the dummy substrate material and the to-be-processed flexible substrate material joined thereto are conveyed.

Thus, a plurality of production lines, such as the first line and the second line can be stopped one after another. Hence, upon occurrence of trouble in a processing apparatus in any of the production lines, only the processing apparatus needing maintenance can be stopped, thereby achieving favorable utilization of apparatuses and reducing manpower for the maintenance. In addition, since the to-be-processed flexible substrate material does not stay in the production lines during the maintenance, adverse influence on the product quality, which is caused by oxidation of the surface thereof, can be prevented.

In the substrate material processing equipment in accordance with a preferred embodiment of the present invention, the first substrate material dividing section may serve also as the third substrate material dividing section.

Since the first substrate material dividing section can serve also as the third substrate material dividing section, the equipment can be downsized, thereby resulting in favorable manufacturing cost.

In the substrate material processing equipment in accordance with a preferred embodiment of the present invention, the first substrate material joining section may serve also as the second substrate material joining section.

Since the first substrate material joining section can serve also as the second substrate material joining section, the equipment can be downsized, thereby resulting in favorable manufacturing cost.

The substrate material processing equipment in accordance with a preferred embodiment of the present invention may further include: a first substrate material supply adjusting section provided between the first line and the first and third substrate material dividing sections, and configured to send out the first or second flexible substrate material after receiving and storing or while receiving the first or second flexible substrate material from the first line; and a second substrate material supply adjusting section provided between the first and second substrate material joining sections and the second line, and configured to send out the first or second flexible substrate material after receiving and storing or while receiving the first or second flexible substrate material from the first and second substrate material joining sections.

With the above configuration, the first substrate material supply adjusting section and the second substrate material supply adjusting section can adjust the carry-in speed of the to-be-processed flexible substrate material (the first flexible substrate material) and the dummy substrate material (the second flexible substrate material) from the first line and the carry-out speed of the to-be-processed flexible substrate material and the dummy substrate material to the second line to be constant. Accordingly, for example, even if the operation of one of the first and second lines is stopped for maintenance, and is started again thereafter, the substrate material conveyance speed in the other line can be kept constant.

In the substrate material processing equipment in accordance with a preferred embodiment of the present invention, the first and second substrate material supply adjusting sections may include substrate material supply adjusting rolls configured to change a conveyance route by reciprocating in a direction intersected at almost a right angle with a direction in which the first or second flexible substrate material is conveyed, while rotating and coming into contact with a surface of the first or second flexible substrate material.

In the above configuration, the first and second substrate material supply adjusting sections include the substrate material supply adjusting rolls configured to change the conveyance route by reciprocating in the direction intersected at almost a right angle with a direction in which the first or second flexible substrate material is conveyed, while rotating and coming into contact with the surface of the to-be-processed flexible substrate material (the first flexible substrate material) or of the dummy substrate material (the second flexible substrate material). Thus, substrate material supply can be adjusted by this simple configuration.

In the substrate material processing equipment in accordance with a preferred embodiment of the present invention, the substrate material supply adjusting rolls may be configured to come into contact with only a surface on a non-processed side of the conveyed first or second flexible substrate material.

In this configuration, since the substrate material supply adjusting roll is configured to come into contact with only the surfaces on the no-processed sides of the conveyed to-be-processed flexible substrate material (the first flexible substrate material) and dummy substrate material (the second flexible substrate material), formation of scratches and the like in the to-be-processed surfaces of the substrate materials can be prevented.

In the substrate material processing equipment in accordance with a preferred embodiment of the present invention, the substrate material conveying section may include a conveyance roll conveying the first or second flexible substrate material by rotating and coming into contact with a surface of the first or second flexible substrate material.

In the above configuration, the substrate material conveying section includes the conveyance roll conveying the flexible substrate material (the first flexible substrate material) and the dummy substrate material (the second flexible substrate material) by rotating and coming into contact with the surface of the to-be-processed flexible substrate material and the dummy substrate material. Hence, the flexible substrate material and the dummy substrate material can be conveyed by this simple mechanism.

In the substrate material processing equipment in accordance with a preferred embodiment of the present invention, the conveyance roll may be configured to come into contact with only a surface on a non-processed side of the first or second flexible substrate material.

In the above configuration, since the conveyance roll is configured so as to come into contact with only the surface on the non-processed side of the conveyed to-be-processed flexible substrate material (the first flexible substrate material)

and dummy substrate material (the second flexible substrate material), formation of scratches and the like in the to-be-processed surfaces of the substrate materials can be prevented.

In the substrate material processing equipment in accordance with a preferred embodiment of the present invention, the substrate material recovery section may include a winding roll for winding up and storing the recovered first or second flexible substrate material.

In this configuration, the substrate material recovery section includes the winding roll winding up and storing the recovered to-be-processed flexible substrate material (the first flexible substrate material) and dummy substrate material (the second flexible substrate material). This can downsize the substrate material recovery section.

In the substrate material processing equipment in accordance with a preferred embodiment of the present invention, the substrate material supply section may include a winding roll for winding up and storing the to-be-supplied first or second flexible substrate material.

In this configuration, the substrate material supply section includes the winding roll winding up and storing the to-be-processed flexible substrate material (the first flexible substrate material) and dummy substrate material (the second flexible substrate material) for supply. This can downsize the substrate material recovery section.

In the substrate material processing equipment in accordance with a preferred embodiment of the present invention, at least one of the first, second, and third substrate material dividing sections may divide the first or second flexible substrate material with the use of a laser beam.

In this configuration, since at least one of the first, second, and third substrate material dividing sections can divide the to-be-processed flexible substrate material (the first flexible substrate material) and the dummy substrate material (the second flexible substrate material) by the laser beam, the to-be-processed flexible substrate material and the dummy substrate material can be divided efficiently.

In the substrate material processing equipment in accordance with a preferred embodiment of the present invention, at least one of the first, second, and third substrate material dividing sections may divide the first or second flexible substrate material with the use of a cutter.

In this configuration, since at least one of the first, second, and third substrate material dividing sections can divide the to-be-processed flexible substrate material (the first flexible substrate material) and the dummy substrate material (the second flexible substrate material) by the cutter, the to-be-processed flexible substrate material and the dummy substrate material can be divided efficiently.

In the substrate material processing equipment in accordance with a preferred embodiment of the present invention, at least one of the first, second, and third substrate material dividing sections may divide the first or second flexible substrate material by utilizing water pressure.

In this configuration, since at least one of the first, second, and third substrate material dividing sections can divide the to-be-processed flexible substrate material (the first flexible substrate material) and the dummy substrate material (the second flexible substrate material) by utilizing the water pressure, efficient division of the to-be-processed flexible substrate material and the dummy substrate material and removal of foreign matter can be achieved.

The substrate material processing equipment in accordance with a preferred embodiment of the present invention may further include: a cleaning section provided after at least one of the first, second, and third substrate material dividing sections for cleaning the first or second flexible substrate material.

In the above configuration, the cleaning section cleaning the to-be-processed flexible substrate material (the first flexible substrate material) and the dummy substrate material (the second flexible substrate material) is provided after at least one of the first, second, and third substrate material dividing sections. As a result, chips and the like of the substrate materials adhering to the substrate material after division can be removed, thereby achieving favorable manufacturing yield and the like.

The substrate material processing equipment in accordance with a preferred embodiment of the present invention may further include: a chamber configured to house the substrate material conveying section, the first, second, and third substrate material dividing sections, the substrate material recovery section, the substrate material supply section, and the first and second substrate material joining sections.

With the above configuration, which further includes the chamber housing the substrate material conveying section, the first, second, and third substrate material dividing sections, the substrate material recovery section, the substrate material supply section, and the first and second substrate material joining sections, adhesion of foreign matter and the like from the outside to the substrate materials can be prevented effectively, thereby achieving favorable manufacturing yield and the like.

In the substrate material processing equipment in accordance with a preferred embodiment of the present invention, the substrate material recovery section may be disposed above substrate material division points of the first, second, and third substrate material dividing sections.

With the above configuration, in which the substrate material recovery section is disposed above the substrate material division points of the first, second, and third substrate material dividing sections, adhesion of chips and the like of the substrate materials, which are formed by division and fall on a material, to the to-be-recovered substrate materials can be prevented effectively, with a result that the recovered substrate material can be reused in a favorable condition.

In the substrate material processing equipment in accordance with a preferred embodiment of the present invention, the substrate material supply section may be disposed above substrate material division points of the first, second, and third substrate material dividing sections.

With the above configuration, in which the substrate material supply section is disposed above the substrate material division points of the first, second, and third substrate material dividing sections, adhesion of chips and the like of the substrate materials, which are formed by division and fall on a supplied material, to the to-be-supplied substrate materials can be effectively prevented, with a result that the recovered substrate material can be used in a favorable condition.

In the substrate material processing equipment in accordance with a preferred embodiment of the present invention, the substrate material recovery section and the substrate material supply section may be disposed on a same side of a conveyance route of the first or second flexible substrate material.

With the above configuration, in which the substrate material recovery section and the substrate material supply section are disposed on the same side of the conveyance route of the to-be-processed flexible substrate material (the first flexible substrate material) and the dummy substrate material (the second flexible substrate material), the dummy substrate material recovered in the substrate material recovery section can be moved easily to the substrate material supply section, with a result of achieving favorable manufacturing efficiency.

The substrate material processing equipment in accordance with a preferred embodiment of the present invention may further include: an alignment member arranged to adjust substrate material joining points by the first and/or second substrate material joining sections.

With the above configuration, which includes the alignment member arranged to adjust the point where the substrate materials are joined by the first and/or second substrate material joining sections, accurate substrate material joining at a desired point can be achieved.

In the substrate material processing equipment in accordance with a preferred embodiment of the present invention, at least one of the first, second, and third substrate material dividing sections may include an alignment member to adjust a substrate material division point.

With the above configuration, in which at least one of the first, second, and third substrate material dividing sections includes the alignment member to adjust the substrate material division point, accurate substrate material division at a desired point can be achieved.

In the substrate material processing equipment in accordance with a preferred embodiment of the present invention, at least one of the first, second, and third substrate material dividing sections may include a position detector arranged to detect a substrate material division point.

In the above configuration, at least one of the first, second, and third substrate material dividing sections includes the position detector arranged to detect the substrate material division point. Hence, if a defect point is formed in a flexible substrate material because of trouble in, for example, the first line, or the like, the conveyed flexible substrate material can be divided at its point immediately before the defect point. Hence, a portion of the flexible substrate material which is processed normally can be efficiently conveyed to the second line.

A substrate material processing method in accordance with a preferred embodiment of the present invention is a substrate material processing method by which, between a first line and a second line performing predetermined processes on continuous flexible substrate materials, a to-be-processed first flexible substrate material and/or a second flexible substrate material joined to the first flexible substrate material is received from the first line and is conveyed to the second line, the method including: a first substrate material dividing step of dividing the first or second flexible substrate material conveyed from the first line; a substrate material recovering step of recovering the first or second flexible substrate material from a start edge thereof which is formed by division in the first substrate material dividing step; a substrate material supplying step of supplying a second flexible substrate material to an end edge of the first or second flexible substrate material which is formed by division in the first substrate material dividing step; a first substrate material joining step of joining the end edge of the first or second flexible substrate material which is formed by division in the first substrate material dividing step to a start edge of the second flexible substrate material supplied in the substrate material supplying step; a second substrate material dividing step of dividing the second flexible substrate material joined to the end edge of the first or second flexible substrate material which is formed by division in the first substrate material dividing step, and being conveyed; a third substrate material dividing step of dividing the first or second flexible substrate material in midstream of recovery in the substrate material recovering step; and a second substrate material joining step of joining a start edge of the first or second flexible substrate material which is formed by division in the third substrate material dividing step to an end edge of the second flexible substrate material which is formed by division in the second substrate material dividing step.

With the above configuration, a plurality of production lines, such as the first line and the second line, can be stopped one after another. Hence, upon occurrence of trouble in a processing apparatus in any of the production lines, only the processing apparatus needing maintenance can be stopped, thereby achieving favorable utilization of apparatuses and reducing manpower for the maintenance. In addition, since the to-be-processed flexible substrate material does not stay in the production lines during the maintenance, adverse influence on the product quality, which is caused by oxidation of the surface thereof, can be prevented.

The substrate material processing method in accordance with the present invention may further include: a first substrate material supply adjusting step of sending out the first or second flexible substrate material after receiving and storing or while receiving the first or second flexible substrate material from the first line; and a second substrate material supply adjusting step of continuously sending out the first or second flexible substrate material to the second line after receiving and storing or while receiving the first or second flexible substrate material after the first and second substrate material joining steps.

With the above configuration, the first substrate material supply adjusting step and the second substrate material supply adjusting step can adjust the carry-in speed of the to-be-processed flexible substrate material (the first flexible substrate material) and/or the dummy substrate material (the second flexible substrate material) from the first line, and the carry-out speed of the to-be-processed flexible substrate material and/or the dummy substrate material to the second line to be constant. Accordingly, for example, even if the operation of one of the first and second lines is stopped for maintenance, and is started again thereafter, the substrate material conveyance speed in the other line can be kept constant.

In the substrate material processing method in accordance with a preferred embodiment of the present invention, the second flexible substrate material recovered in the substrate material recovering step may be used as the second flexible substrate material supplied in the substrate material supplying step.

According to the above configuration, the dummy substrate material (the second flexible substrate material) recovered in the substrate material recovering step can be used as the dummy substrate material supplied in the substrate material supplying step, with a result that favorable manufacturing cost can be achieved.

In the substrate material processing method in accordance with a preferred embodiment of the present invention, joining of the end edge of the second flexible substrate material which is formed by division in the first substrate material dividing step to the start edge of the second flexible substrate material supplied in the substrate material supplying step and/or joining of the start edge of the second flexible substrate material which is formed by division in the third substrate material dividing step or of the first flexible substrate material to the end edge of the second flexible substrate material which is formed by division in the second substrate material dividing step may be performed by fusing.

In the above configuration, the substrate materials are joined by fusing. This can achieve easy and favorable substrate joining.

In the substrate material processing method in accordance with a preferred embodiment of the present invention, joining of the end edge of the second flexible substrate material which is formed by division in the first substrate material dividing step to the start edge of the second flexible substrate material supplied in the substrate material supplying step and/or joining of the start edge of the second flexible substrate material which is formed by division in the third substrate material dividing step or of the first flexible substrate material to the end edge of the second flexible substrate material which is formed by division in the second substrate material dividing step may be performed with use of a tape having chemical resistance.

With the above configuration, in which the substrate materials are joined with the use of the tape having chemical resistance, corrosion of the tape by chemicals used for etching in the second line can be prevented, with a result that the adhesiveness of the tape can be maintained favorably.

In the substrate material processing method in accordance with a preferred embodiment of the present invention, joining of the end edge of the second flexible substrate material which is formed by division in the first substrate material dividing step to the start edge of the second flexible substrate material supplied in the substrate material supplying step and/or joining of the start edge of the second flexible substrate material which is formed by division in the third substrate material dividing step or of the first flexible substrate material to the end edge of the second flexible substrate material which is formed by division in the second substrate material dividing step may be performed with use of a tape having heat resistance.

With the above configuration, in which the substrate materials are joined with the use of the tape having heat resistance, degradation of the adhesiveness of the tape, which is caused by heating in the second line, can be prevented, with a result that the adhesiveness of the tape can be maintained favorably.

Another substrate material processing method in accordance with a preferred embodiment of the present invention is a substrate material processing method by which, between a first line and a second line performing predetermined processes on continuous flexible substrate materials, a to-be-processed first flexible substrate material and/or a second flexible substrate material joined to the first flexible substrate material is received from the first line and conveyed to the second line, the method including: a substrate material dividing step of dividing the first flexible substrate material conveyed from the first line; a substrate material recovering step of recovering the first flexible substrate material from a start edge thereof which is formed by division in the substrate material dividing step; and a substrate material supplying step of supplying a first or second flexible substrate material to an end edge of the first flexible substrate material which is formed by division in the substrate material dividing step.

According to the substrate material processing method thus configured, if trouble occurs, for example, in the second line, and the second line and conveyance of the substrate material to the second line must be stopped, the to-be-processed flexible substrate material (the first flexible substrate material) conveyed from the first line is divided first. Then, the flexible substrate material continuously conveyed from the first line is recovered from its divided start edge. In this time, the dummy substrate material (the second flexible substrate material) is joined to the end edge of the flexible substrate material being conveyed to the second line, and is conveyed continuously. When it advances to a predetermined point of the conveyance route, the second line and conveyance of the substrate material to the second line are stopped. Accordingly, the second line in which trouble occurs and conveyance of the substrate material to the second line can be stopped, while the flexible substrate material from the first line can be carried in continuously.

A still another substrate material processing method in accordance with a preferred embodiment of the present invention is a substrate material processing method by which, between a first line and a second line performing predetermined processes on continuous flexible substrate materials, a to-be-processed first flexible substrate material and/or a second flexible substrate material joined to the first flexible substrate material is received from the first line and conveyed to the second line, the method including: a carry-in stopping step of stopping carry-in of the first flexible substrate material from the first line; a substrate material dividing step of dividing the first flexible substrate material of which carry-in from the first step is stopped in the carry-in stopping step; a substrate material supplying step of supplying another flexible substrate material to an end edge of the first flexible substrate material which is formed by division in the substrate material dividing step; and a substrate material joining step of joining the end edge of the first flexible substrate material which is formed by division in the substrate material dividing step to a start edge of the another flexible substrate material supplied in the substrate material supplying step.

According to the substrate material processing method thus configured, if trouble occurs in, for example, the first line, the first line and conveyance of the substrate material from the first line are stopped. Then, the to-be-processed flexible substrate material (the first flexible substrate material) conveyed from the first line is divided. Next, another flexible substrate material is joined to the end edge of the flexible substrate material which is formed by division, and is then conveyed to the second line. Accordingly, the first line, in which trouble occurs, and conveyance of the flexible substrate material from the first line to the second line can be stopped, while the flexible substrate material can be conveyed continuously to the second line.

In the above substrate material processing method in accordance with a preferred embodiment of the present invention, the first or second flexible substrate material may be divided in the substrate material dividing step after a predetermined division point of the conveyed first or second flexible substrate material is detected.

In this configuration, the to-be-processed flexible substrate material (the first substrate material) or the dummy substrate material (the second flexible substrate material) is divided in the substrate material dividing step after the predetermined division point of the conveyed substrate material is detected. Hence, if a defect point is formed in a substrate material because of occurrence of trouble in, for example, the first line, or the like, the conveyed substrate material can be divided at its point immediately before the defect point. As a result, a portion of the substrate material which is processed normally can be conveyed efficiently.

As described above, various preferred embodiments of the present invention are useful in substrate material processing equipment and a substrate material processing methods using it.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. Substrate material processing equipment provided between a first line and a second line performing predetermined processes on a continuous flexible substrate material, comprising:
   a substrate material conveying section configured to receive from the first line and convey to the second line a to-be-processed first substrate material and/or a second flexible substrate material joined to the first flexible substrate material;
   a first substrate material dividing section configured to divide the first or second flexible substrate material conveyed by the substrate material conveying section from the first line;
   a substrate material recovery section configured to recover the first or second flexible substrate material from a start edge thereof which is formed by division by the first substrate material dividing section;
   a substrate material supply section configured to supply the first or second flexible substrate material to an end edge of the substrate material which is formed by division by the first substrate material dividing section;
   a first substrate material joining section configured to join the end edge of the substrate material to a start edge of the substrate material supplied from the substrate material supply section;
   a second substrate material dividing section provided between the substrate material supply section and the second line, and configured to divide the first or second flexible substrate material;
   a third substrate material dividing section provided between the first line and the substrate material recovery section, and configured to divide the first or second flexible substrate material in midstream of recovery by the substrate material recovery section; and
   a second substrate material joining section configured to join a start edge of the first or second flexible substrate material which is formed by division by the third substrate material dividing section to an end edge of the first or second flexible substrate material which is formed by division by the second substrate material dividing section.

2. The equipment of claim 1, wherein the first substrate material dividing section serves also as the third substrate material dividing section.

3. The equipment of claim 1, wherein the first substrate material joining section serves also as the second substrate material joining section.

4. The equipment of claim 1, further comprising:
   a first substrate material supply adjusting section provided between the first line and the first and third substrate material dividing sections, and configured to send out the first or second flexible substrate material after receiving and storing or while receiving the first or second flexible substrate material from the first line; and
   a second substrate material supply adjusting section provided between the first and second substrate material joining sections and the second line, and configured to send out the first or second flexible substrate material after receiving and storing or while receiving the first or second flexible substrate material from the first and second substrate material joining sections.

5. The equipment of claim 4, wherein the first and second substrate material supply adjusting sections include substrate material supply adjusting rolls configured to change a conveyance route by reciprocating in a direction intersected at almost a right angle with a direction in which the first or second flexible substrate material is conveyed, while rotating and coming into contact with a surface of the first or second flexible substrate material.

6. The equipment of claim 5, wherein the substrate material supply adjusting rolls are configured to come into contact with only a surface on a non-processed side of the conveyed first or second flexible substrate material.

7. The equipment of claim 1, wherein the substrate material conveying section includes a conveyance roll conveying the first or second flexible substrate material by rotating and coming into contact with a surface of the first or second flexible substrate material.

8. The equipment of claim 7, wherein the conveyance roll is configured to come into contact with only a surface on a non-processed side of the first or second flexible substrate material.

9. The equipment of claim 1, wherein the substrate material recovery section includes a winding roll arranged to wind up and store the recovered first or second flexible substrate material.

10. The equipment of claim 1, wherein the substrate material supply section includes a winding roll arranged to wind up and store the to-be-supplied first or second flexible substrate material.

11. The equipment of claim 1, wherein at least one of the first, second, and third substrate material dividing sections divides the first or second flexible substrate material with the use of a laser beam.

12. The equipment of claim 1, wherein at least one of the first, second, and third substrate material dividing sections divides the first or second flexible substrate material with the use of a cutter.

13. The equipment of claim 1, wherein at least one of the first, second, and third substrate material dividing sections divides the first or second flexible substrate material by utilizing water pressure.

14. The equipment of claim 1, further comprising a cleaning section provided after at least one of the first, second, and third substrate material dividing sections and arranged to clean the first or second flexible substrate material.

15. The equipment of claim 1, further comprising a chamber configured to house the substrate material conveying section, the first, second, and third substrate material dividing sections, the substrate material recovery section, the substrate material supply section, and the first and second substrate material joining sections.

16. The equipment of claim 1, wherein the substrate material recovery section is disposed above substrate material division points of the first, second, and third substrate material dividing sections.

17. The equipment of claim 1, wherein the substrate material supply section is disposed above substrate material division points of the first, second, and third substrate material dividing sections.

18. The equipment of claim 1, wherein the substrate material recovery section and the substrate material supply section are disposed on a same side of a conveyance route of the first or second flexible substrate material.

19. The equipment of claim 1, further comprising an alignment member arranged to adjust substrate material joining points by the first and/or second substrate material joining sections.

20. The equipment of claim 1, wherein at least one of the first, second, and third substrate material dividing sections includes an alignment member arranged to adjust a substrate material division point.

21. The equipment of claim 1, wherein at least one of the first, second, and third substrate material dividing sections includes a position detector arranged to detect a substrate material division point.

* * * * *